(12) United States Patent
Kamakura

(10) Patent No.: US 11,215,825 B2
(45) Date of Patent: Jan. 4, 2022

(54) WEARABLE DISPLAY APPARATUS

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 16 days.

(21) Appl. No.: 16/829,321

(22) Filed: Mar. 25, 2020

(65) Prior Publication Data

US 2020/0310118 A1 Oct. 1, 2020

(30) Foreign Application Priority Data

Mar. 26, 2019 (JP) .............................. JP2019-057895

(51) Int. Cl.
*G09G 5/00* (2006.01)
*G02B 27/01* (2006.01)

(52) U.S. Cl.
CPC ....... *G02B 27/0149* (2013.01); *G02B 27/017* (2013.01); *G02B 2027/0169* (2013.01); *G02B 2027/0178* (2013.01)

(58) Field of Classification Search
CPC .............. G02B 27/0149; G02B 27/017; G02B 2027/0169; G02B 2027/0178; G06F 1/163; G06F 1/1639; G06F 1/1647; G06F 1/203
See application file for complete search history.

(56) References Cited

U.S. PATENT DOCUMENTS

| | | | | |
|---|---|---|---|---|
| 2012/0141838 A1* | 6/2012 | Lin | ...................... | H01M 50/116 429/7 |
| 2014/0162557 A1* | 6/2014 | Clayson | .............. | H04M 1/0262 455/41.2 |
| 2014/0293430 A1* | 10/2014 | Takahashi | ............ | G03B 21/005 359/630 |
| 2015/0277126 A1* | 10/2015 | Hirano | ............... | G02B 27/0101 359/633 |
| 2017/0235129 A1* | 8/2017 | Kamakura | .......... | G02B 27/0006 345/8 |
| 2017/0237935 A1* | 8/2017 | Totani | ...................... | H04N 5/64 348/802 |
| 2018/0017786 A1* | 1/2018 | Kamakura | .......... | G02B 27/0172 |
| 2018/0017995 A1* | 1/2018 | Gable | ....................... | H05K 5/04 |

FOREIGN PATENT DOCUMENTS

JP 2017-147523 A 8/2017

* cited by examiner

*Primary Examiner* — Insa Sadio
(74) *Attorney, Agent, or Firm* — Oliff PLC

(57) ABSTRACT

Provided is a wearable display apparatus including a display element, an electronic circuit board, a circuit board holder configured to hold an electronic circuit board, and an exterior case configured to accommodate the display element and the circuit board, wherein an inner seal structure is provided in a location where the circuit board holder faces an opposing connecting portion of the exterior case from an inner side thereof.

17 Claims, 16 Drawing Sheets

WEARABLE DISPLAY APPARATUS

The present application is based on, and claims priority from JP Application Serial Number 2019-057895, filed Mar. 26, 2019, the disclosure of which is hereby incorporated by reference herein in its entirety.

BACKGROUND

1. Technical Field

The present disclosure relates to a wearable display apparatus configured to present a virtual image to an observer.

2. Related Art

As a wearable display apparatus, an apparatus that has an eyeglass-like appearance, and incorporates an image forming unit, a projection optical device, a control circuit, and the like in an accommodating portion that is an exterior part arranged on a side of the wearer's head is known (JP-A-2017-147523). In the apparatus disclosed in JP-A-2017-147523, in a connecting portion between a side surface configuring the accommodating portion and an upper and lower case, a fitting structure including, for example, grooves and protrusions, and a connecting structure using a step are provided, and waterproofing is aimed at.

In the apparatus disclosed in JP-A-2017-147523, waterproofing can be achieved by the fitting structure. However, when fastening of an upper case and the like constituting the accommodating portion is loosened, the waterproofing function in the fitting structure may be reduced.

SUMMARY

An aspect of the present disclosure is a wearable display apparatus including a display element, a circuit board, a circuit board holder configured to hold the circuit board, and an exterior case configured to accommodate the display element and the circuit board, wherein an inner seal structure is provided in a location where the circuit board holder faces a connecting portion of the exterior case from an inner side thereof.

BRIEF DESCRIPTION OF THE DRAWINGS

FIG. 13 is a conceptual cross-sectional view for explaining a slide seal structure and the like.

FIG. 14 is a conceptual cross-sectional view for explaining the slide seal structure and the like.

DESCRIPTION OF EXEMPLARY EMBODIMENTS

An embodiment of a wearable display apparatus of the present disclosure are described below with reference to the accompanying drawings.

Figure 1:
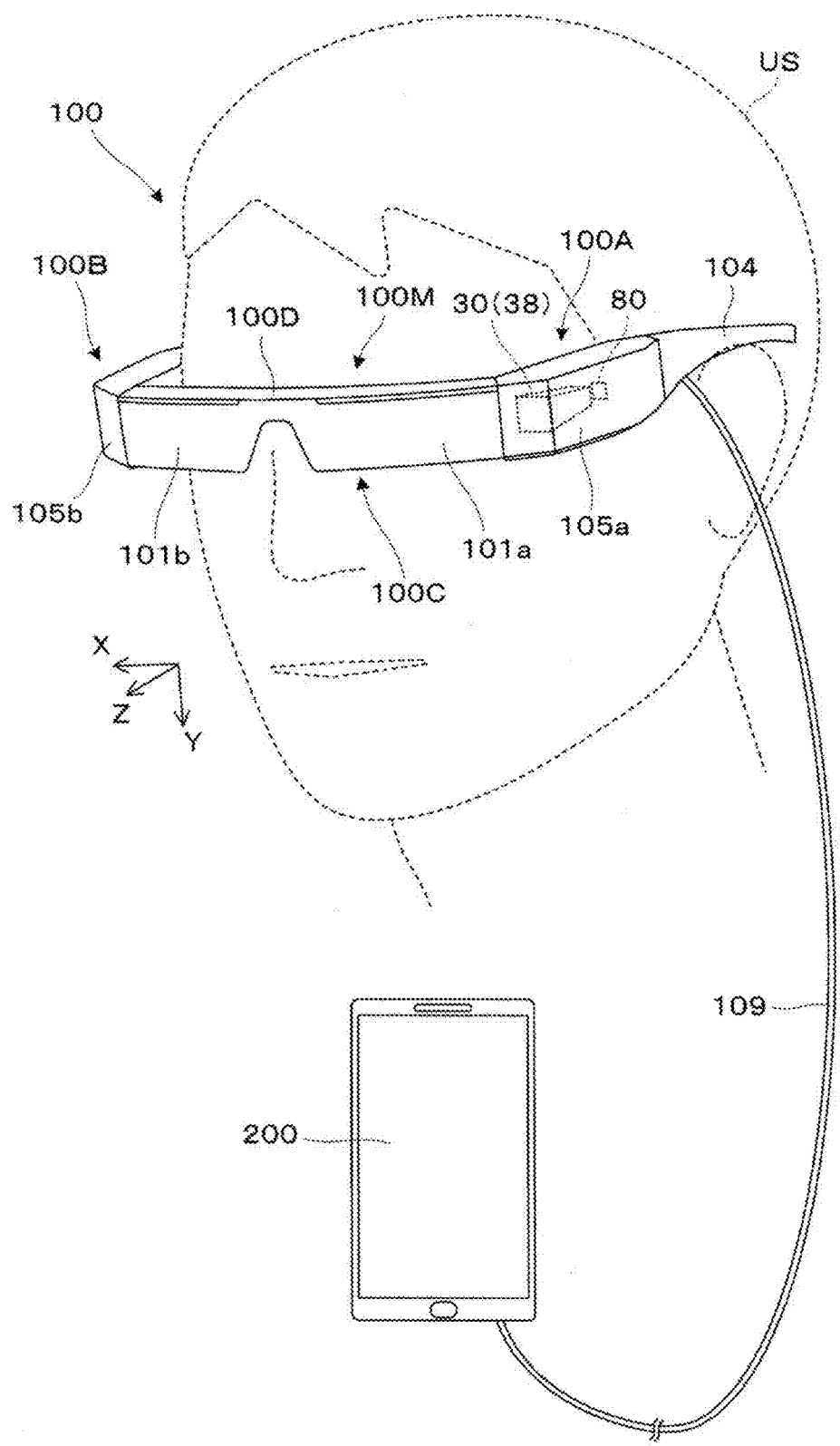
FIG. 1 is a perspective view for explaining a used state of a wearable display apparatus according to an embodiment.
Figure 2:
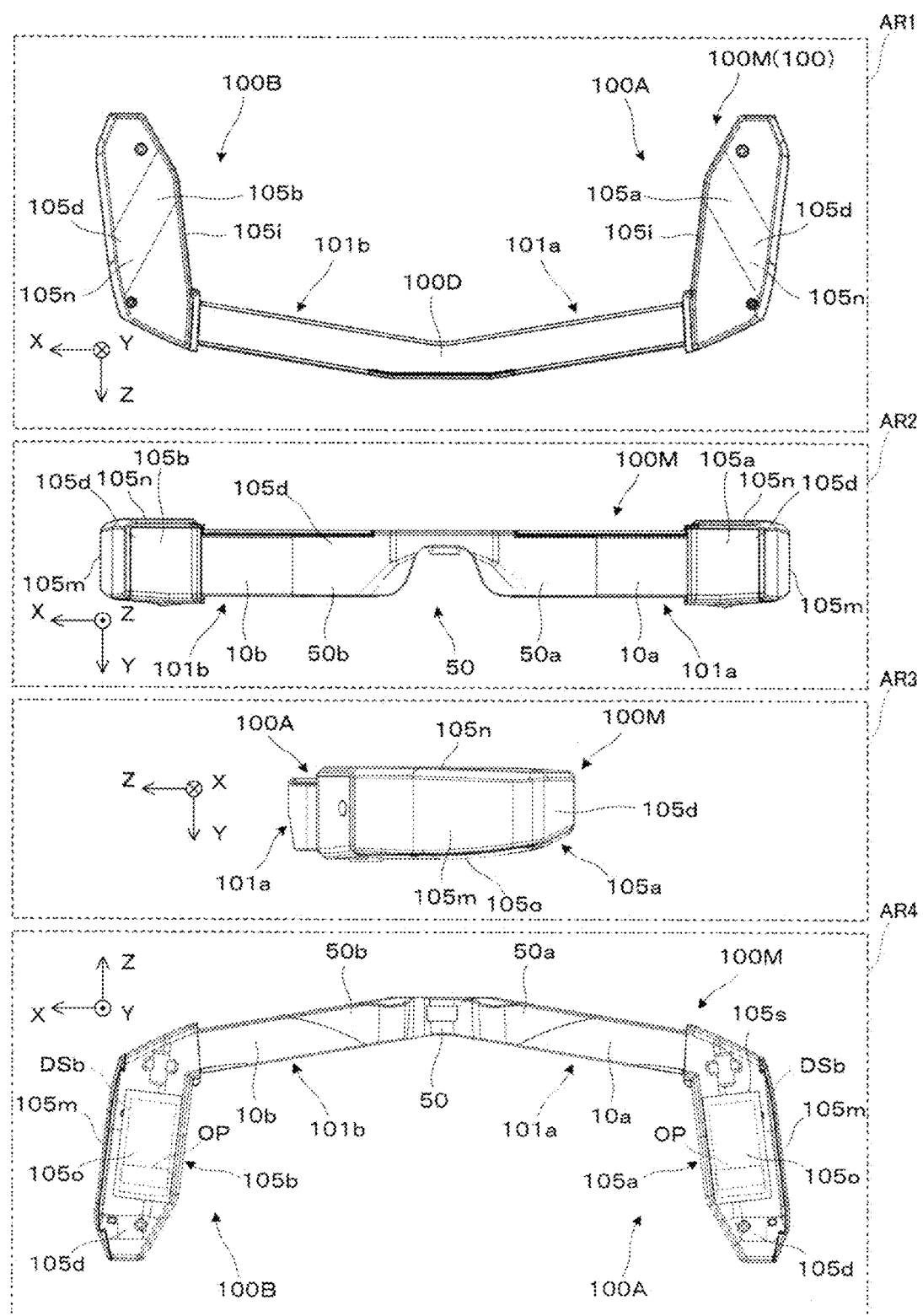
FIG. 2 is a diagram for explaining an appearance of a main portion of the wearable display apparatus.

As illustrated in FIG. 1 and FIG. 2, the wearable display apparatus 100 of the embodiment is a head-mounted display (HMD) having an eyeglass-like appearance. In FIG. 1 and the like, X, Y, and Z are an orthogonal coordinate system, an +X direction corresponds to a lateral direction in which both eyes of an observer wearing the wearable display apparatus 100 are aligned, a +Y direction corresponds to a lower direction orthogonal to the lateral direction in which both eyes of the observer are aligned, and a +Z direction corresponds to a front direction of the observer or a front surface direction. In FIG. 2, a first area AR1 is a plan view of a main body 100M of the wearable display apparatus 100, a second area AR2 is a front view of the main body 100M, a third area AR3 is a left side view of the main body 100M, and a fourth area AR4 is a bottom view of the main body 100M.

The wearable display apparatus 100 can not only cause a virtual image to be visually recognized by an observer or wearer US wearing the wearable display apparatus 100, but also can cause an external image to be observed by a see-through manner. The wearable display apparatus 100 can be communicably connected to a smartphone or other external device 200 via a cable 109, and can form a virtual image corresponding to an image signal input from the external device 200, for example. The wearable display apparatus 100 includes a first display device 100A and a second display device 100B. The first display device 100A and the second display device 100B are devices that respectively form a virtual image for the left eye and a virtual image for the right eye. The first display device 100A for the left eye includes a first virtual image forming optical unit 101a that covers the front of the observer's eyes to be seen through, and a first image forming main body 105a that forms image light. The first display device 100B for the right eye includes a second virtual image forming optical unit 101b that covers the front of the observer's eyes to be seen through, and a second image forming main body 105b that forms image light.

A temple 104, which is a temple part extending rearward from a side surface of the head, is rotatably attached to rear portions of the first and second image forming main bodies 105a and 105b by a hinge (not illustrated), and the attachment of the wearable display apparatus 100 is ensured by abutting the observer's ear or temple, or the like. Although not illustrated in the drawings, a nose pad that forms a support portion along with the temple 104 is provided in a recess formed between the first and second virtual image forming optical units 101a and 101b, and the nose pad enables locating the virtual image forming optical units 101a, 101b and the like with respect to the observer's eyes.

Figure 3:
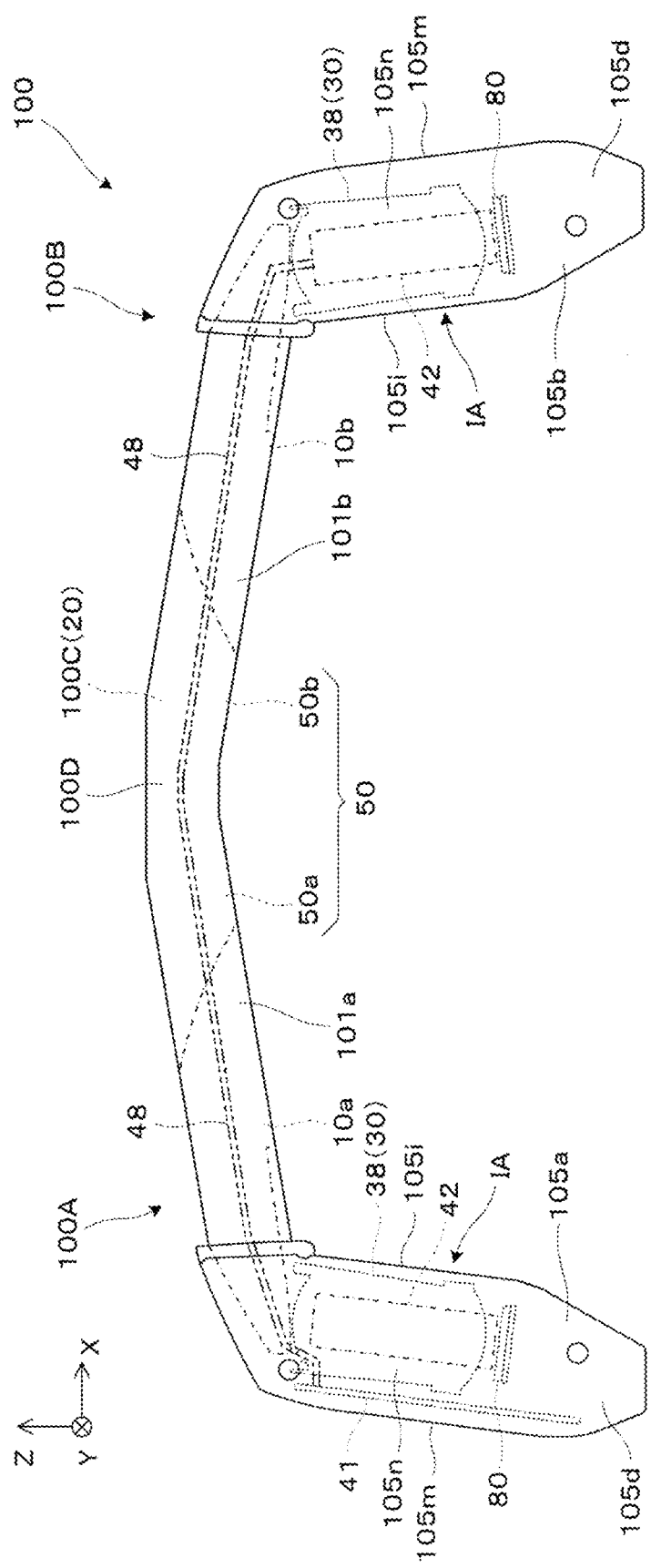
FIG. 3 is a plan view for explaining a main portion of the wearable display apparatus.

With reference to FIG. 3, an internal structure of the wearable display apparatus 100 will be described. The first image forming main body 105a for the left eye holds a display element 80, a lens barrel 38, electronic circuit boards 41 and 42, and the like, in a cover-like exterior case 105d. The lens barrel 38 is associated with a projection lens 30 and supports an optical element (not illustrated) for image formation. By collectively accommodating the display element 80, the lens barrel 38, the electronic circuit boards 41 and 42, and the like, which are small, in the exterior case 105d, the wearable display apparatus 100 can be made multifunctional and the appearance can be made small and stylish. The lens barrel 38, the display element 80, and the electronic circuit boards 41 and 42 are supported within the exterior case 105d that is metal made, and in particular, the display element 80 and the lens barrel 38 are fixed in a state of being aligned with respect to the tip end of the first virtual image forming optical unit 101a. The second image forming main body 105b for the right eye includes a display element 80, a lens barrel 38, an electronic circuit board 42 and the like in a cover-like exterior case 105d. The lens barrel 38, the display element 80, and the electronic circuit board 42 are supported within the exterior case 105d that is made of metal, and in particular, the display element 80 and the lens barrel 38 are fixed in a state of being aligned with respect to the tip end of the second virtual image forming optical unit 101b.

In the first image forming main body 105a for the left eye, the projection lens 30 or the lens barrel 38 is arranged upstream from the optical path with respect to the first virtual image forming optical unit 101a, and configures a part of an imaging system. The projection lens 30 is arranged closer to the front, that is, closer to +Z in the exterior case 105d. The display element 80 is a display device configured to form an image corresponding to a virtual image for the left eye. The display element 80 is arranged adjacent to the rear side, that is, −Z side of the projection lens 30 in the exterior case 105d. The electronic circuit board 41 is a signal processing board configured to process a signal including extrinsic information. The electronic circuit board 41 has interface function with the external device, and is configured to manage and control the display operation of the electronic circuit board 42. The electronic circuit board 41 is arranged outside the lens barrel 38 and the display element 80 at a position close to an outer side surface 105m of the exterior case 105d. The electronic circuit board 42 is a drive circuit board configured to drive the display element 80 in the first image forming main body 105a, and operate under control of the electronic circuit board 41. The electronic circuit board 42 is arranged above the lens barrel 38 at a location close to an upper side surface 105n of the exterior case 105d. As a result, the electronic circuit board 41 is arranged on the outer side (−X side), which is opposite to the wearer side with respect to the electronic circuit board 42 in the exterior case 105d, and is arranged on the lower side (+Y side) with respect to the electronic circuit board 42 in the exterior case 105d.

In the second image forming main body 105b for the right eye, the projection lens 30 is arranged upstream from the optical path with respect to the second virtual image forming optical unit 101b, and configures a part of an imaging system. The projection lens 30 is arranged closer to the front, that is, closer to +Z in the exterior case 105d. The display element 80 is a display device configured to form an image corresponding to a virtual image for the right eye. The display element 80 is arranged adjacent to the rear side, that is, −Z side of the projection lens 30 in the exterior case 105d. In the second image forming main body 105b, a circuit board corresponding to the electronic circuit board 41 provided in the first image forming main body 105a is non-provided. The electronic circuit board 42 is a drive circuit board configured to drive the display element 80 in the second image forming main body 105b. The electronic circuit board 42 operates under control of the electronic circuit board 41 provided in the separated first image forming main body 105a. Similar to the electronic circuit board 42 provided in the first image forming main body 105a, the electronic circuit board 42 of the second image forming main body 105b is arranged above the lens barrel 38 at a location close to the upper side surface 105n of the exterior case 105d.

The first and second virtual image forming optical units 101a and 101b are connected at the center rather than separated to form a transparent light-guiding unit 100C that is an integral member. The transparent light-guiding unit 100C includes a pair of light-guiding members 10a and 10b that are configured to guide image light from the display element 80, and a center member 50 that enables a superposed view of the external image. The pair of light-guiding members 10a and 10b is a pair of optical members configured to contribute to image formation while propagating image light therein. The center member 50 includes a pair of light transmission portions 50a and 50b, one light transmission portion 50a is joined to one light-guiding member 10a, and the other light transmission portion 50b is joined to the other light-guiding member 10b. The transparent light-guiding unit 100C is a composite light-guiding device 20 that provides images for both eyes of the observer by light guiding, and is supported by the exterior case 105d at both ends, that is, on tip end sides of the light-guiding members 10a and 10b.

An upper cover 100D is fixed to the top surface of the transparent light-guiding unit 100C. A thin and narrow space is formed between the upper cover 100D and the transparent light-guiding unit 100C, and a signal line 48 electrically coupling the first image forming main body 105a and the second image forming main body 105b extends in the space.

The electronic circuit board 41 incorporated in the first image forming main body 105a is a main circuit board configured to control the overall operation of the wearable display apparatus 100, and control the operation of the electronic circuit board 42, which is a drive circuit board. The electronic circuit board 41 has interface function for performing signal conversion on signals received from the external device 200 by communicating with the external device 200. The electronic circuit board 41 is configured to convert image data input from the external device 200, for example, into image data suitable for display on the display element 80, and cause the display element 80 to perform display corresponding to the image data input from the external device 200. The electronic circuit board 42 incorporated in the first image forming main body 105a operates under control of the electronic circuit board 41 as a drive circuit board driving the display element 80. Although detailed description is omitted, the electronic circuit board 42 receives the image data or the image signal output from the electronic circuit board 41 and causes the display element 80 to perform two-dimensional image display. The electronic circuit board 42 outputs a drive signal corresponding to the image to the display element 80.

The display element 80 incorporated in the first image forming main body 105a is a self-luminous display device configured to enable two-dimensional display and operate in a dot-matrix manner. Specifically, each display element 80 is assumed to be a display panel of an organic EL (Electroluminescence), but the present disclosure is not limited to this, and may be a panel for a Liquid Crystal Display (LCD). When a panel for LCD is used, a suitable illumination light source is required. The display element 80 can be driven by the electronic circuit board 42 to form a color image on a rectangular display surface and display a two-dimensional moving image or still image.

The electronic circuit board 42 incorporated in the second image forming main body 105b has the same structure as the electronic circuit board 42 incorporated in the first image forming main body 105a, and operates under the control of the electronic circuit board 41 as a drive circuit board driving the display element 80 provided in the second image forming main body 105b. The display element 80 incorporated in the second image forming main body 105b has the same structure as the display element 80 incorporated in the first image forming main body 105a. The electronic circuit board 41 is not included in the second image forming main body 105b.

Figure 4:
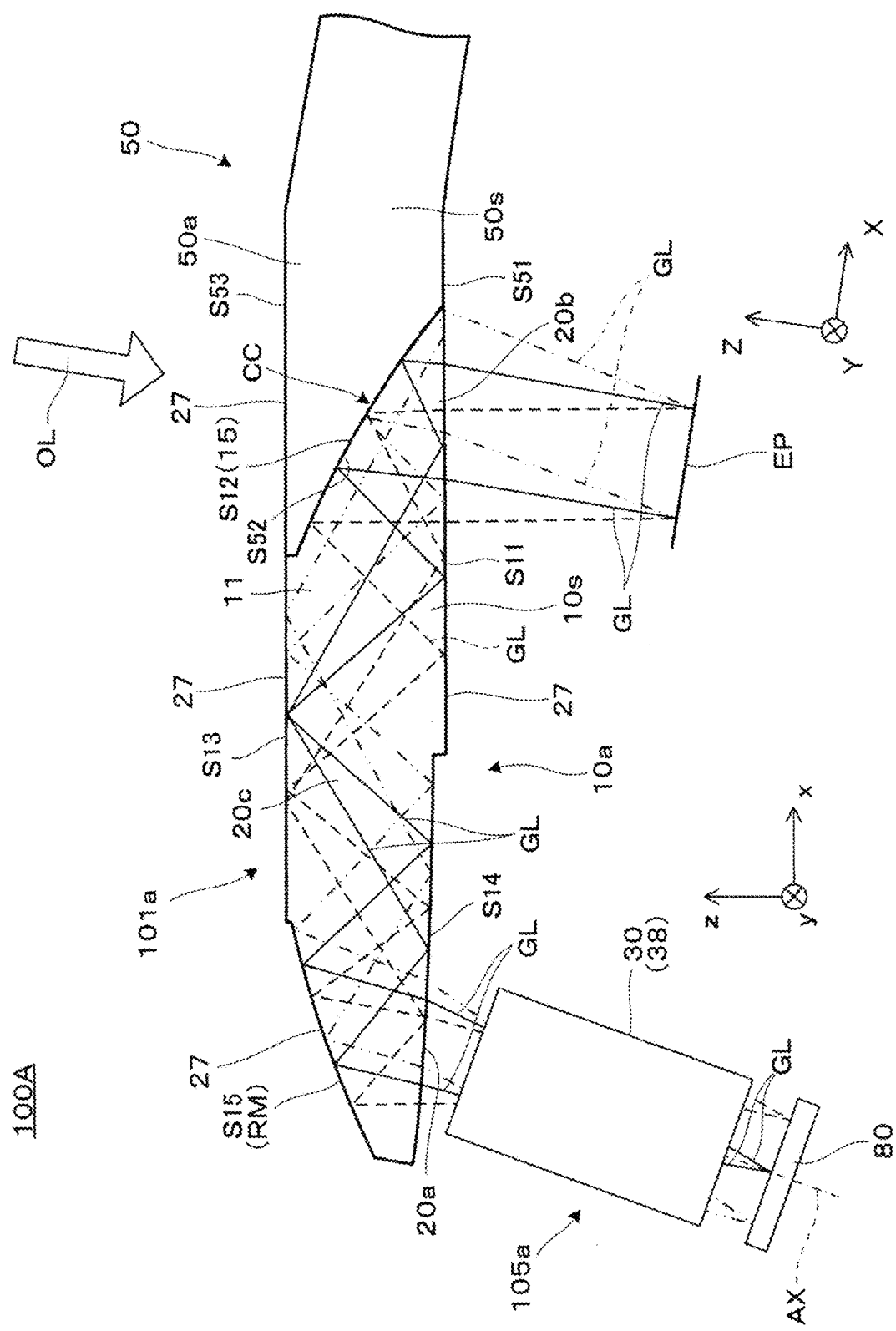
FIG. 4 is a plan view for explaining an optical structure of a first virtual image forming optical unit.

FIG. 4 is a diagram illustrating a part of the first display device 100A, and particularly illustrates the optical structure of the first virtual image forming optical unit 101a. As described above, the wearable display apparatus 100 includes the first display device 100A and the second display device 100B (see FIG. 1), but the first display device 100A and the second display device 100B have a left-right symmetric and equivalent structure, thus, only the first display device 100A will be described, and the description of the second display device 100B will be omitted. Note that, in FIG. 4, x, y, and z are orthogonal coordinate system, the x direction and the y direction are parallel to a first surface S11 and a third surface S13, and the z direction is perpendicular to the first surface S11 and the third surface S13.

The light-guiding member 10a of the first virtual image forming optical unit 101a is joined to the light transmission portion 50a via an adhesive layer CC. The light-guiding member 10a and the light transmission portion 50a have a structure in which the surface of body members 10s and 50s is covered with a hard coat layer 27. The body member 10s of the light-guiding member 10a is made of a resin material with high optical transparency in a visible range and is molded, for example, by pouring a thermoplastic resin into a mold and curing the resin. The same structure applies the light transmission portion 50a or the center member 50, and the body member 50s is made of the same material as the body member 10s of the light-guiding member 10a.

Below, the optical path of image light GL will be briefly described. The light-guiding member 10a guides the image light GL emitted from the projection lens 30 toward the observer's eyes, by reflection and the like on the first to fifth surfaces S11 to S15. Specifically, the image light GL from the projection lens 30 is first incident into a part of the fourth surface S14 formed in a light incident portion 20a and is reflected by the fifth surface S15 that is an inner surface of a reflective film RM, is incident again from the inside and is totally reflected on the fourth surface S14, is incident and totally reflected on the third surface S13, and is incident and totally reflected on the first surface S11. The image light GL totally reflected by the first surface S11 is incident on the second surface S12, and is partially reflected while partially transmitting through a half mirror 15 provided on the second surface S12, and is incident again on and transmitting through the first surface S11 formed in a light emitting portion 20b. The image light GL passed through the first surface S11 is incident, as a substantially parallel luminous flux, on an exit pupil EP where the observer's eye is located. That is, the observer observes the image formed by the image light as a virtual image.

The first virtual image forming optical unit 101a causes the image light to be visually recognized by the observer through the light-guiding member 10a, and cause the external image with little distortion to be observed by the observer, in a state where the light-guiding member 10a and the light transmission portion 50a are combined. At this time, since the third surface S13 and the first surface S11 are substantially parallel to each other (diopter is approximately 0), almost no aberration or the like occurs in an external light OL. Further, a third transmission surface S53 and a first transmission surface S51 are planes that are substantially parallel to each other. Furthermore, since the third transmission surface S53 and the first surface S11 are planes that are substantially parallel to each other, almost no aberration or the like occurs. As described above, the observer observes the external image with no distortion through the light transmission portion 50a.

Note that, although the detailed description is omitted, the optical structure of the second virtual image forming optical unit 101b has a structure obtained by horizontally reversing the optical structure of the first virtual image forming optical unit 101a.

Figure 5:
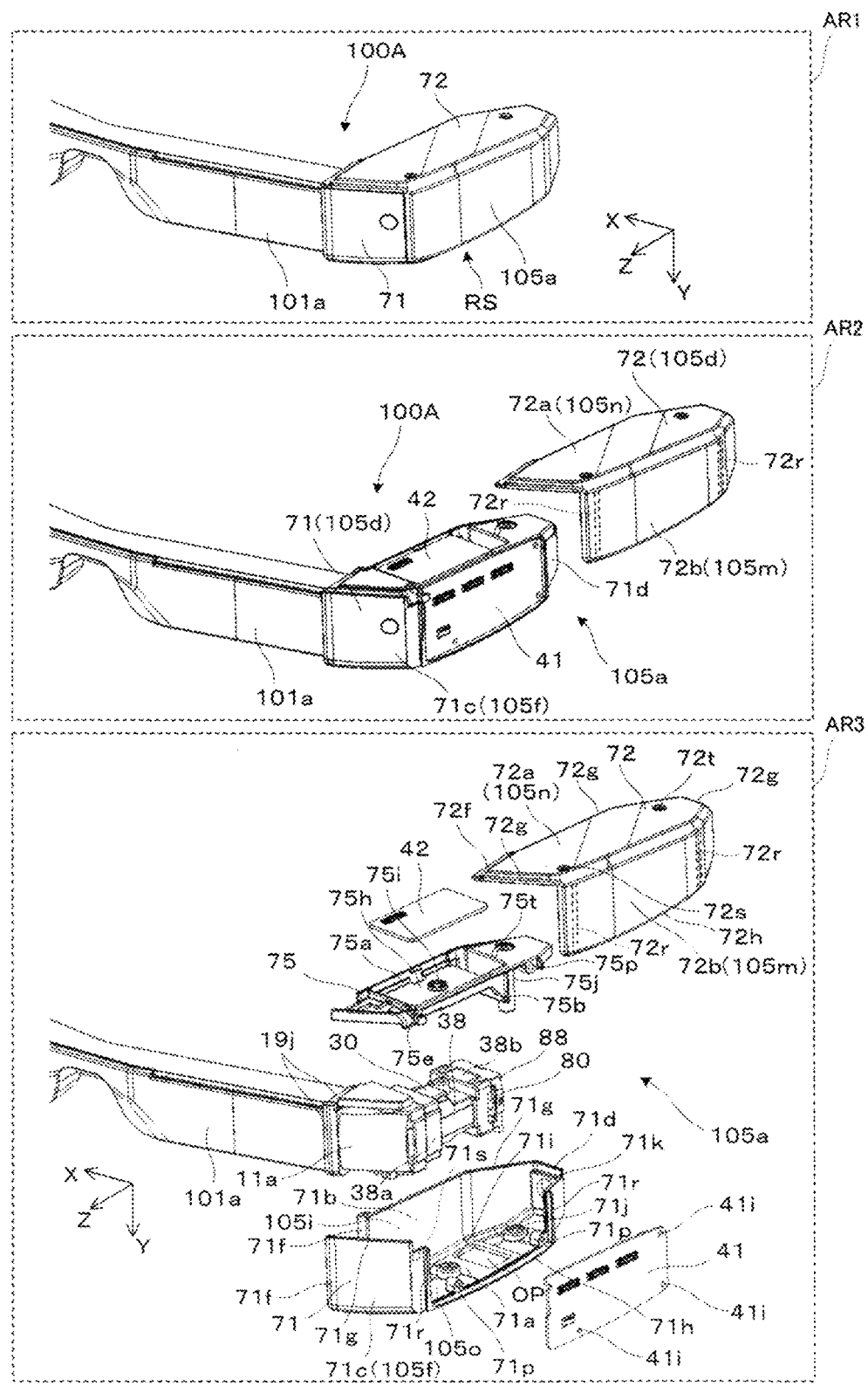
FIG. 5 is a perspective view for explaining an appearance and an internal structure of a first image forming main body.

With reference to FIG. 5, the internal structure of the first image forming main body 105a will be described. In FIG. 5, a first area AR1 is a perspective view of the first display device 100A, a second area AR2 is a partially exploded perspective view illustrating a state in which a second member 72 is removed from the exterior case 105d, and a third area AR3 illustrates a state in which the exterior case 105d and the electronic circuit boards 41 and 42 are separated.

Figure 6:
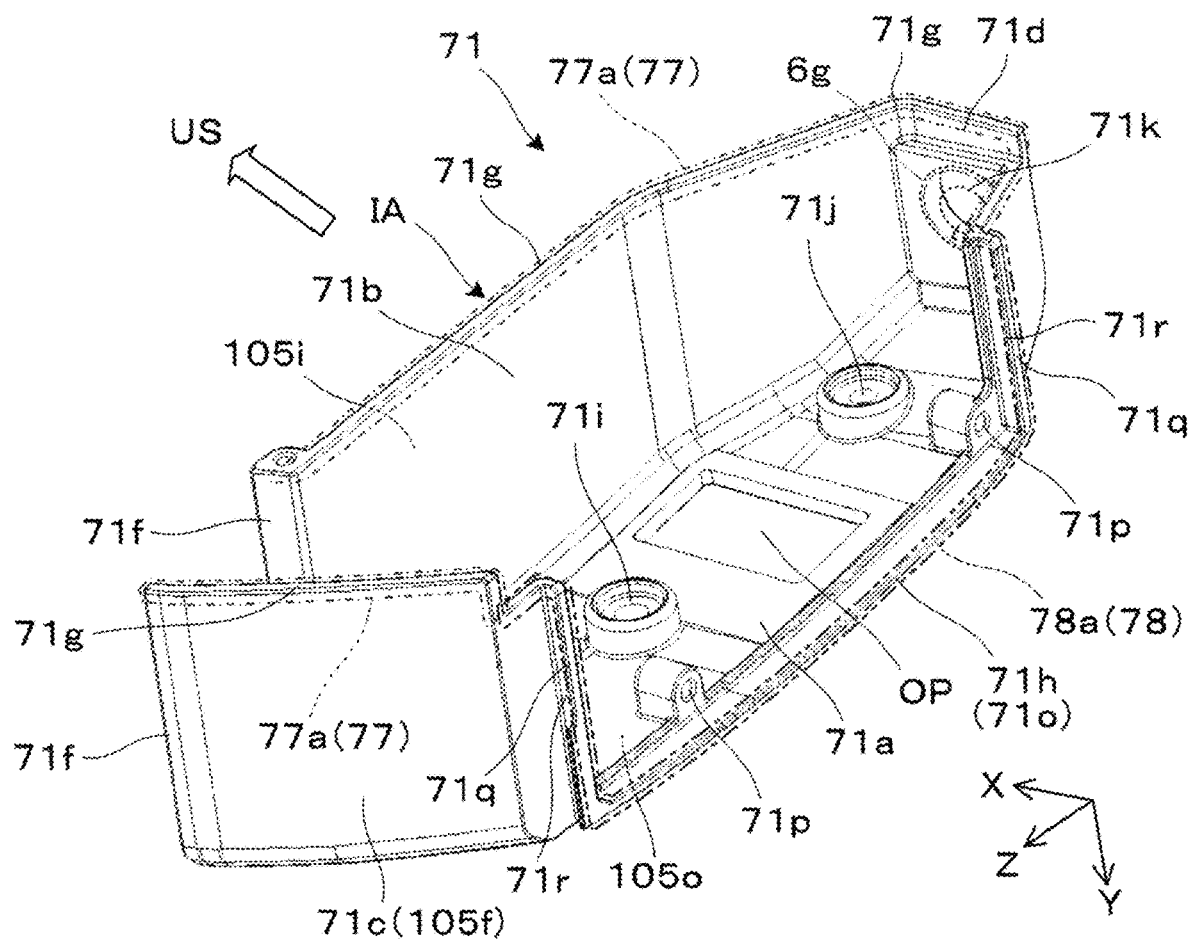
FIG. 6 is a perspective view for explaining a first member of an exterior case of the first image forming main body.
Figure 7:
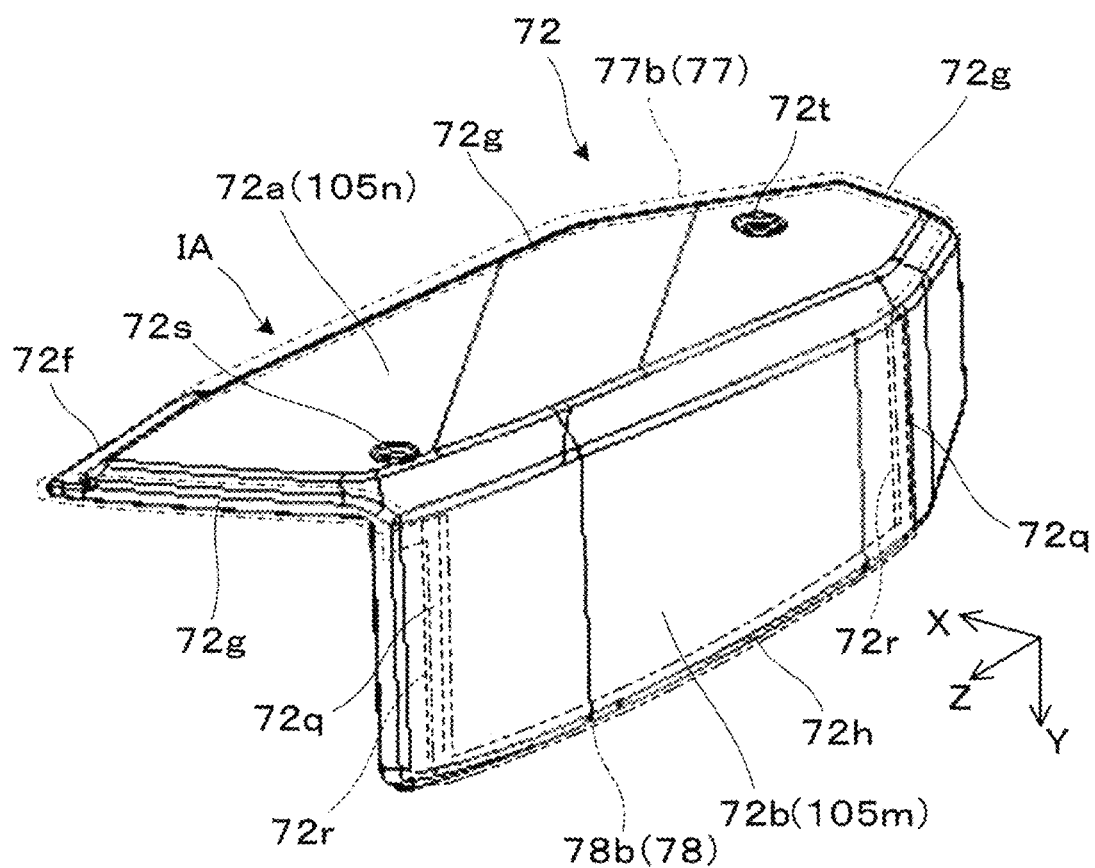
FIG. 7 is a perspective view for explaining a second member of the exterior case of the first image forming main body.

The exterior case 105d includes a first member 71 and a second member 72, and an inner space (see FIG. 9 and the like) is formed by combining the first member 71 and the second member 72 while sliding them together in the vertical direction. As illustrated in FIG. 6, the first member 71 serving as a lower member is an integral part that includes a base plate portion 71a forming a lower side surface 105o, an inner plate portion 71b forming an inner side surface 105i, a front plate portion 71c forming a front side surface 105f, and a rear wall portion 71d forming the appearance of a rear part. The first member 71 is cast from, for example, a magnesium alloy. As illustrated in FIG. 7, the second member 72 serving as an upper member is an integral part that includes an upper plate portion 72a that forms the upper side surface 105n, and an outer plate portion 72b that forms an outer side surface 105m. The second member 72 is also cast from, for example, a magnesium alloy. In the above, the bottom plate portion 71a and the inner plate portion 71b of the first member 71 are two side surface portions connected to each other at an angle close to a right angle, and the upper plate portion 72a and the outer plate portion 72b of the second member 72 are two side surface portions connected to each other at an angle close to a right angle. Here, the bottom plate portion 71a of the first member 71, the inner plate portion 71b of the first member 71, the upper plate portion 72a of the second member 72, and the outer plate portion 72b of the second member 72 are a plurality of side surface portions surrounding the columnar exterior case 105d, and form a peripheral side surface RS of the exterior case 105d as a whole. That is, the exterior case 105d has a box shape surrounding the display element 80, the electronic circuit boards 41 and 42, the lens barrel 38, and the like from above and below, inside and outside. The magnesium alloy forming the exterior case 105d includes aluminum, zinc, and the like in addition to magnesium. By forming the exterior case 105d with a magnesium alloy, high heat conductivity (for example, 50 to 100 W/(m·K)) while being lightweight can be achieved, and heat dissipation of the electronic circuit boards 41 and 42 and the display element 80 via the exterior case 105d can be made effective.

A circuit board holder 75 that holds the electronic circuit boards 41 and 42 is fixed inside the exterior case 105d. The circuit board holder 75 is a molded product made of a plastic material, and has heat-shielding properties as compared with the exterior case 105d. By forming the circuit board holder 75 from a plastic material, the degree of freedom of the shape of the circuit board holder 75 is increased, and the accommodation and arrangement inside the exterior case 105d are facilitated.

Figure 8:
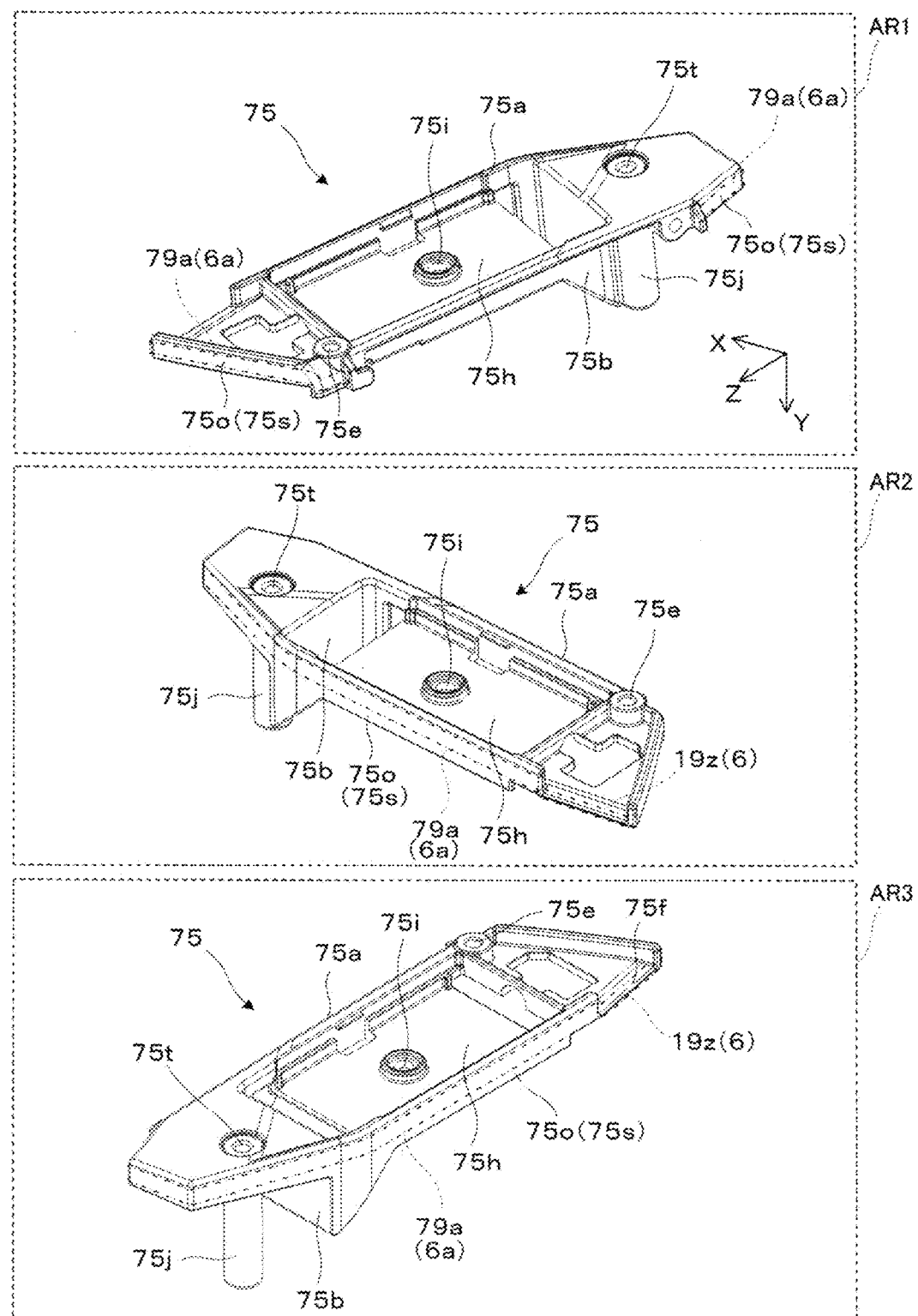
FIG. 8 is a perspective view for explaining a circuit board holder accommodated in the exterior case.

As illustrated in a first area AR1, a second area AR2, and a third area AR3 in FIG. 8, the circuit board holder 75 includes a plate-like portion 75a and a partition wall 75b. In the exterior case 105d, the circuit board holder 75 forms a layered upper space close to the upper plate portion 72a of the second member 72, a layered outer space close to the outer plate portion 72b of the second member 72, and a rear space surrounded by the rear wall portion 71d of the first member 71, by partitioning the inner space IS of the exterior case 105d (see FIG. 9 and the like). The electronic circuit board 41, which is the main circuit board, is supported by the plate-like portion 75a and the partition wall 75b, and is accommodated in the outer space. The electronic circuit board 42, which is the drive circuit board, is supported by the plate-like portion 75a and is accommodated in the upper space. In this way, by using the circuit board holder 75, the arrangement of the electronic circuit boards 41 and 42 in the exterior case 105d can be freely set. In addition, the circuit board holder 75 can suppress the extent to which the heat dissipation from the electronic circuit boards 41 and 42 affects the display element 80.

When the fixing method is described with reference to FIG. 5 and the like, the lens barrel 38 of the projection lens 30 is fixed at the front tip end 38a with respect to the tip end 11a of the first virtual image forming optical unit 101a, in an aligned state using screws or the like. A case portion 88 that holds the display element 80 is fixed to the rear tip end 38b of the lens barrel 38 using a fitting structure or a bonding material. The lens barrel 38 supporting the display element 80 is fixed and integrated with respect to the circuit board holder 75 by screws (not illustrated) using an insertion hole 75i provided in the circuit board holder 75. The lens barrel 38 integrated with the circuit board holder 75 is fixed to the first member 71 of the exterior case 105d together with the tip end 11a of the first virtual image forming optical unit 101a by screws (not illustrated) using an insertion hole 71i provided in the first member 71. The circuit board holder 75 integrated with the lens barrel 38 is supported on the first member 71 of the exterior case 105d by screws (not illustrated) using a columnar boss 75j provided on the circuit board holder 75 and an insertion hole 71j provided in the first member 71. The electronic circuit board 41 is fixed to the circuit board holder 75 by screws (not illustrated) using a screw hole 75p provided in the circuit board holder 75 at one position among three insertion holes 41i, and is fixed to the first member 71 by screws (not illustrated) using two screw holes 71p provided in the first member 71 at the remaining two positions among the three insertion holes 41i. The electronic circuit board 42 is inserted into a recess portion 75h provided in the circuit board holder 75, and is fixed in advance to the circuit board holder 75 by snap fitting. The first member 71 includes a pair of slide guides 71r that are grooves or protrusions extending in the Y direction at an outer edge of the front plate portion 71c and an outer edge of the rear wall portion 71d, and the second member 72 includes a pair of slide guides 72r that are steps or grooves extending in the Y direction on the inner side or inner surface side of the outer plate portion 72b. The slide guides 71r and 72r enable the first member 71 and the second member 72 to slide relative to each other in the vertical ±Y directions. A portion that enables movement only in the ±Y directions and restricts movement in the −X direction may be formed only in a portion close to the lower end side of the slide guides 71r and 72r, that is, a portion close to the bottom plate portion 71a. By sliding the second member 72 toward the first member 71, the first member 71 and the second member 72 are combined with each other as a whole to form a case (see the first area AR1 in FIG. 5). In a state in which the first member 71 and the second member 72 are combined with each other as a case, an outer edge 71h of the bottom plate portion 71a provided in the first member 71 is adhered to an outer edge 72h of the lower end of the outer plate portion 72b provided in the second member 72. Similarly, an outer edge 71g of the upper end of the front plate portion 71c provided in the first member 71 is adhered to an outer edge 72g of the front side of the upper plate portion 72a provided in the second member 72, and outer edges 71g of the upper ends of the inner plate portion 71b and the rear wall portion 71d provided in the first member 71 is adhered to outer edges 72g of the inner side and the rear side of the upper plate portion 72a provided in the second member 72. The second member 72 is fixed to the first member 71 at the position of a screw hole 71s by screws (not illustrated) using an insertion hole 72s provided in the second member 72 and an insertion hole 75e of the circuit board holder 75. Further, the second member 72 is fixed to the circuit board holder 75 at the position of a screw hole 75t by screws (not illustrated) using an insertion hole 72t provided in the second member 72, and is supported by the exterior case 105d via the circuit board holder 75. With the structure described above, when the screws is removed, the first member 71 and the second member 72 can be separated, the circuit board holder 75 can be removed from the first member 71, the electronic circuit boards 41 and 42, the lens tube 38, and the like can be removed, and conversely, they can be assembled again. Such an openable/closeable structure makes it relatively easy to replace the electronic circuit boards 41 and 42, the lens barrel 38, and the like.

Although not illustrated in the drawings, an FPC extends between the electronic circuit board 41 that is the main circuit board, and the electronic circuit board 42 that is the drive circuit board, and the FPC electrically couples both electronic circuit boards 41 and 42. The FPC extends upward from the display element 80 and is electrically coupled to the electronic circuit board 42.

Figure 9:
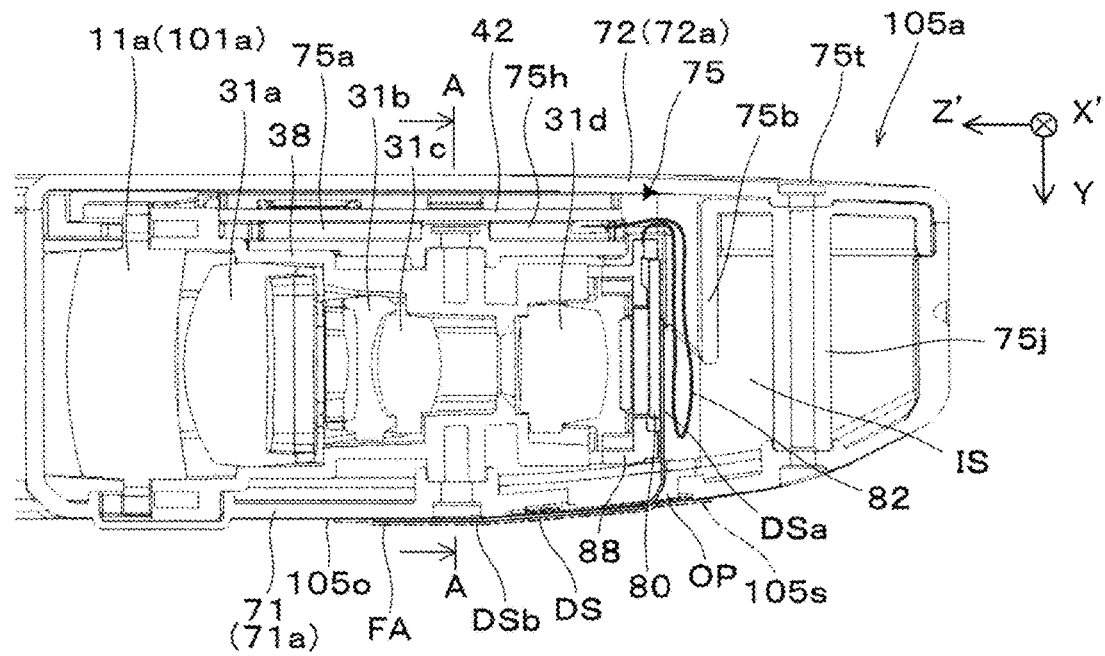
FIG. 9 is a side cross-sectional view of the first image forming main body.
Figure 10:
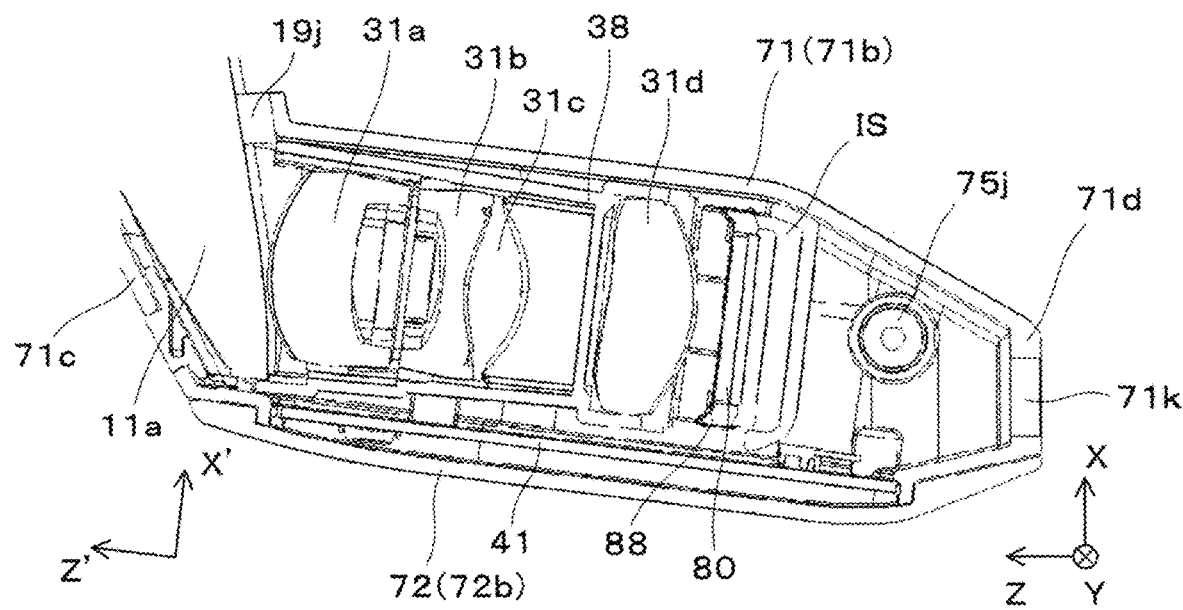
FIG. 10 is a plan cross-sectional view of the first image forming main body.
Figure 11:
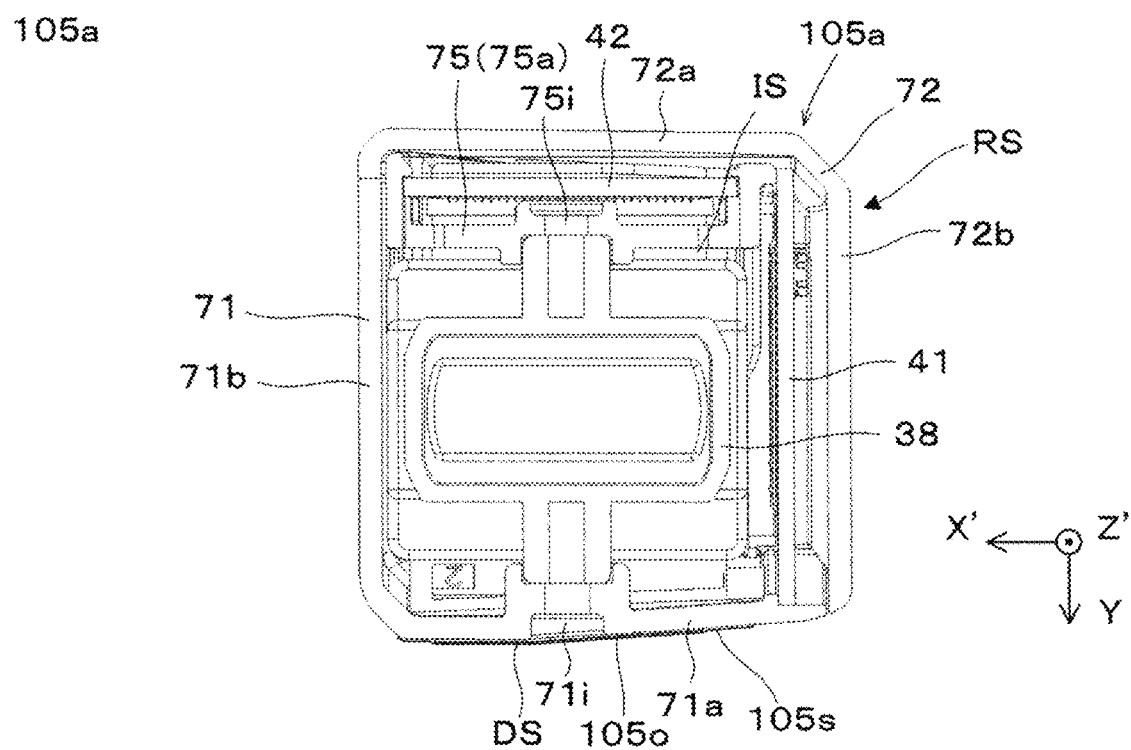
FIG. 11 is a cross-sectional view of the first image forming main body.

With reference to FIGS. 9 to 11, a cross-sectional structure in the exterior case 105d of the first image forming main body 105a will be described. FIG. 9 is a cross-sectional view along the longitudinal direction of the first image forming body 105a, FIG. 10 is a XZ cross-sectional view of the first image forming body 105a, and FIG. 11 is a cross-sectional view taken along line AA in FIG. 9. In FIG. 11 and the like, X' and Z' are coordinates with reference to the longitudinal direction of the exterior case 105*d*.

In the exterior case 105*d*, a first lens 31*a* held by the lens barrel 38 of the projection lens 30 is arranged opposite the tip end 11*a* of the first virtual image forming optical unit 101*a*. The first lens (optical element) 31*a* to a fourth lens (optical element) 31*d* are held in the lens barrel 38 as optical elements for image formation. The display element 80 is supported and aligned with the case portion 88 in a state close to the fourth lens 31*d* of the projection lens 30. The electronic circuit board 41 that is the main circuit board, is supported by the circuit board holder 75 and is arranged close to the outer plate portion (side surface portion) 72*b* of the second member 72. As a result, the heat dissipation from the electronic circuit board 41 to the outer plate portion (side surface portion) 72*b* becomes efficient, and the electronic circuit board 41 can be efficiently cooled. The electronic circuit board 42 that is the drive circuit board, is supported by the circuit board holder 75 and is arranged close to the upper plate portion (side surface portion) 72*a* of the second member 72. As a result, the heat dissipation from the electronic circuit board 42 to the upper plate portion (side surface portion) 72*a* becomes efficient, and the electronic circuit board 41 can be efficiently cooled. A heat dissipation sheet DS attached to the rear surface of the display element 80 via a heat conductive bonding material or adhesive material is used to conduct heat from the display element 80 to the exterior case 105*d*. The heat dissipation sheet DS extends outside the exterior case 105*d* via an opening OP provided in the exterior case 105*d*, rather than inside the exterior case 105*d*. The opening OP is formed in the bottom plate portion 71*a* that is the lower portion of the side surface portion of the exterior case 105*d*. Thus, the opening OP becomes inconspicuous. The heat dissipation sheet DS is drawn out from the opening OP and extends forward, a second end DSb of the heat dissipation sheet DS is configured to attach a heat conductive bonding material or adhesive material on the inside, and is attached to a front part FA of the lower side surface 105*o*, in a two-dimensionally wide adhesion state. The cable 109 (see FIG. 1) coupled to the electronic circuit board 41 is passed through an opening 71*k* formed in the rear wall portion 71*d* of the first member 71.

Returning to FIG. 6 and FIG. 7, a seal between the first member 71 and the second member 72 configuring the exterior case 105*d* will be described. The outer edge 71*g* of the upper end of the inner plate portion 71*b*, the outer edge 71*g* of the upper end of the front plate portion 71*c*, and the outer edge 71*g* of the upper end of the rear wall portion 71*d*, which are provided in the first member 71, form a first opposing part 77*a* configuring an opposing connecting portion 77. Additionally, the outer edges 72*g* of the inner side, the front side, and the rear side of the upper plate portion provided in the second member 72 form a second opposing part 77*b* that constitutes the opposing connecting portion 77. Here, the opposing connecting portion 77 is a portion to be sealed. The inner plate portion 71*b* is a portion arranged on the inner side IA on the wearer US side of the exterior case 105*d*, and faces the temple of the wearer US.

Figure 12:
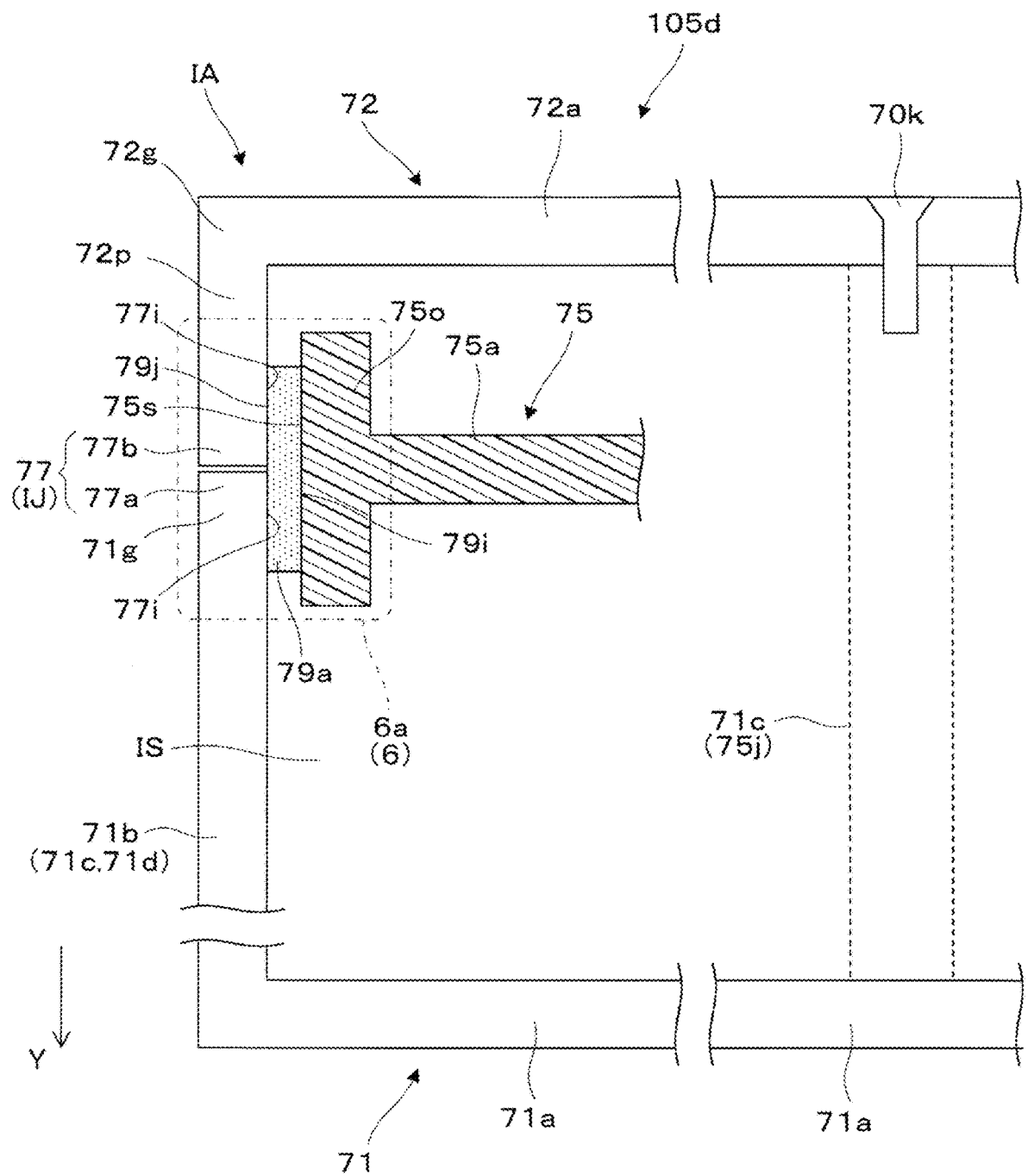
FIG. 12 is a conceptual cross-sectional view for explaining an inner seal structure.

FIG. 12 is a cross-sectional view conceptually illustrating the structure of the opposing connecting portion 77 provided in the exterior case 105*d*. The outer edges 71*g* that are the upper ends of the inner plate portion 71*b*, the front plate portion 71*c*, and the rear wall portion 71*d* extend in the vertical or vertical Y direction. On the outer edge 72*g* of the upper plate portion 72*a* of the second member 72, a vertical bending portion 72*p* protruding downward is formed, and the vertical bending portion 72*p* extends in the vertical or vertical Y direction. In a state in which the exterior case 105*d* is assembled, the outer edge 71*g* serving as the first opposing part 77*a* and the vertical bending portion 72*p* serving as the second opposing part 77*b*, which constitute the opposing connecting portion 77, are opposed to each other at the end surfaces, the inner surfaces 77*i* of the outer edge 71*g* and the vertical bending portion 72*p* extend in the vertical or vertical Y direction. Here, the circuit board holder 75 accommodated in the exterior case 105*d* is opposed to the opposing connecting portion 77 of the exterior case 105*d* from the inner side. More specifically, the inner surface 77*i* of the first member 71 side and the inner surface 77*i* of the second member 72 are arranged opposite the vicinity of the outer surface 75*s* formed in an outer frame 75*o* provided in the plate-like portion 75*a* of the circuit board holder 75. A sealing member 79*a* made of an elastic resin is attached as a part of the circuit board holder 75 along the outer surface 75*s* of the circuit board holder 75. By using this type of sealing member 79*a*, the sealing member 79*a* can be brought into adhered to the opposing connecting portion 77 of the exterior case 105*d* from the inner side, and fluid tightness can be easily maintained. That is, the sealing member 79*a* or the circuit board holder 75 including the sealing member 79*a* can seal the gap between the pair of opposing parts 77*a* and 77*b* by adhering to the opposing connecting portion 77, and can keep the inside of the exterior case 105*d* in a liquid-tight state. A combination of the opposing connecting portion 77, the sealing member 79*a*, and the outer frame 75*o* is referred to as an inner seal structure 6*a*. The inner seal structure 6*a* is configured to perform sealing from the inner side such that the sealing member 79*a* or the circuit board holder 75 including the sealing member 79*a* are brought into adhered to the opposing connecting portion 77 from the inner side corresponding to the inner space IS. The sealing member 79*a* is made of, for example, a foam rubber. The foam rubber is urethane foam, and has a cell structure containing very fine, and high-density bubbles that are independently uniformly dispersed. By using the foam rubber as the sealing member 79*a*, the deformation and adhesion of the sealing member 79*a* can be easily ensured. In the sealing member 79*a*, an adhesive layer is formed on the inner surface 79*i* that is opposed to the outer side surface 75*s* of the circuit board holder 75. On the other hand, the outer surface 79*j* that is opposed to the inner surface 77*i* of the opposing connecting portion 77 is processed into a smooth surface. Therefore, when the first member 71 and the second member 72 move away from each other in the vertical direction, a gap is generated between the opposing parts 77*a* and 77*b*, but an adhesion state between the inner surface 77*i* of the opposing connecting portion 77 and the outer surface 79*j* of the sealing member 79*a* is maintained. As a result, even if the screw 70*k* connecting the first member 71 and the second member 72 is loosened, the fluid tightness of the opposing connecting portion 77 is maintained. That is, the inner seal structure 6*a* seals inside the exterior case 105*d* in parallel to the screwing direction of the exterior case 105*d*, that is, the Y direction. In other words, the inner seal structure 6*a* has a structure in which the sealing member 79*a* is applied from the side to abut the inner surface 77*i* parallel to the Y direction in which the exterior case 105*d* is closed by the screw. That is, the sealing member 79*a* extends in a direction intersecting with the opposing surfaces of the opposing parts 77*a* and 77*b*, and abuts the inside of the opposing parts 77*a* and 77*b* such that the opposing parts 77*a* and 77*b* are indirectly connected to each other along the opposing parts 77*a* and 77*b*. According to this structure, it is assumed that the exterior case 105*d* can be opened and closed with screws such as the screw 70k, the function of the inner seal structure 6a can be maintained even if the screws of the exterior case 105d is somewhat loosened. The upper end of the inner plate portion 71b constituting the first member 71 constitutes an inner connecting portion IJ provided on the wearer US side of the opposing connecting portion 77. The inner seal structure 6a on the wearer US side corresponding to the inner connecting portion IJ is configured to seal the inner connecting portion IJ associated with the opposing connecting portion 77 formed on the inner side IA on the wearer US side in the exterior case 105d, that is, the inner connection portion IJ. In this case, waterproof properties on the inside increase, and durability against moisture such as sweat from the wearer US can be enhanced.

Returning to FIG. 6 and FIG. 7, the outer edge 71h outside the bottom plate portion 71a of the first member 71, a peripheral portion 71q of the slide guide 71r provided in the front plate portion 71c of the first member 71, and a peripheral portion 71q of the slide guide 71r provided in the rear wall portion 71d of the first member 71 constitute a first overlapping part 78a configuring an overlapping connecting portion 78. Further, the outer edge 72h at the lower end of the outer plate portion 72b of the second member 72, a peripheral portion 72q of the slide guide 72r provided in the vicinity of the front end of the outer plate portion 72b of the second member 72, and a peripheral portion 72q of the slide guide 72r provided in the rear portion of the outer plate portion 72b of the second member 72 constitute a second overlapping part 78b configuring the overlapping connecting portion 78.

Figure 13:
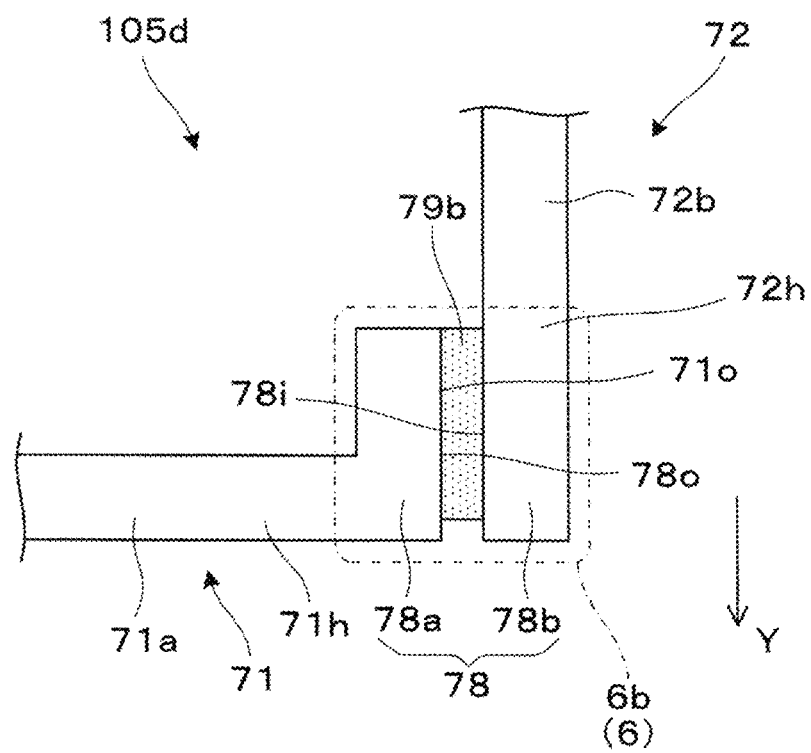

FIG. 13 is a cross-sectional view conceptually illustrating a structure of a portion, which extends in the lateral direction, of the overlapping connecting portion 78 provided in the exterior case 105d. An end surface 71o formed on the outer edge 71h of the bottom plate portion 71a of the first member 71 extends in parallel to the vertical or vertical Y direction. On the other hand, the outer edge 72h of the outer plate portion 72b of the second member 72 extends in parallel to the vertical or vertical Y direction. In a state in which the exterior case 105d is assembled, the end surface 71o that is formed on the outer edge 71h of the bottom plate portion 71a and that serves as the first overlapping part 78a configuring the overlapping connecting portion 78, and the outer edge 72h, which serves as the second overlapping part 78b, of the outer plate portion 72b of the second member 72 extend in parallel to the Y direction while facing each other in the vicinity. That is, an outer surface 78o of the first overlapping part 78a and an inner surface 78i of the second overlapping part 78b extend in parallel to the Y direction while facing each other in the vicinity. A sealing member 79b made of an elastic resin is attached along the outer surface 78o of the first overlapping part 78a. The sealing member 79b can intimate contact with the inner surface 78i of the second overlapping part 78b to seal the gap between the pair of overlapping parts 78a and 78b, and keep the interior of the exterior case 105d in a liquid-tight state. The sealing member 79b is made of, for example, a foam rubber. A structure in which the overlapping connecting portion 78 and the sealing member 79b as described above are combined is referred to as a slide seal structure 6b. The slide seal structure 6b is provided between the first member 71 and the second member 72 at a position different from the inner seal structure 6a. According to the slide seal structure 6b, waterproofing can be achieved in the overlapping connecting portion 78 that is closed using the slide guides 71r and 72r, and the like.

Figure 14:
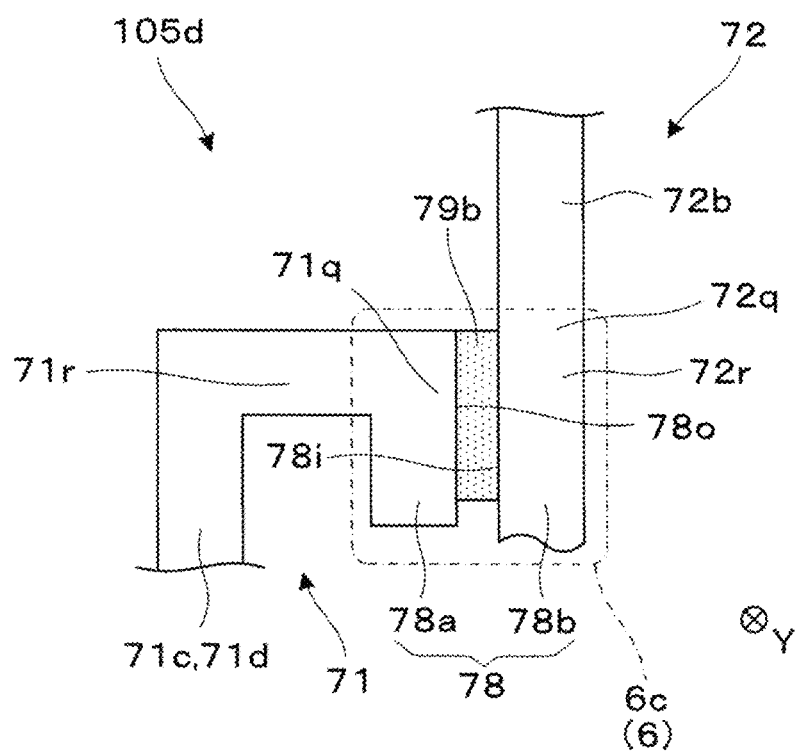

FIG. 14 is a cross-sectional view conceptually illustrating a structure of a portion, which extends in the vertical direction, of the overlapping connecting portion 78 provided in the exterior case 105d. The peripheral portions 71q of the slide guides of the front plate portion 71c and the rear wall portion 71d of the first member 71 extend in parallel to the vertical or vertical Y direction. Further, the peripheral portions 72q of the pair of front and rear slide guides 72r of the outer plate portion 72b of the second member 72 extend in parallel to the vertical or vertical Y direction. In a state in which the exterior case 105d is assembled, the peripheral portions 71q, which serves as the first overlapping part 78a configuring the overlapping connecting portion 78, of the slide guides 71r, and the peripheral portions 72q, which serves as the second overlapping part 78b, of the slide guides 72r extend in parallel to the Y direction while facing each other in the vicinity. In this case, the outer surface 78o of the first overlapping part 78a and the inner surface 78i of the second overlapping part 78b extend in parallel to the Y direction while facing each other the vicinity. A sealing member 79b made of an elastic resin is attached along the outer surface 78o of the first overlapping part 78a. The sealing member 79b can intimate contact with the inner surface 78i of the second overlapping part 78b to seal the gap between the pair of overlapping parts 78a and 78b, and keep the interior of the exterior case 105d in a liquid-tight state. The sealing member 79b is made of, for example, a foam rubber. A structure in which the overlapping connecting portion 78 and the sealing member 79b as described above are combined is referred to as a slide seal structure 6c. The slide seal structure 6c is provided between the first member 71 and the second member 72 at a position different from the inner seal structure 6a. According to the slide seal structure 6c, waterproofing can be achieved in the overlapping connecting portion 78 that is closed using the slide guides 71r and 72r, and the like.

Figure 15:
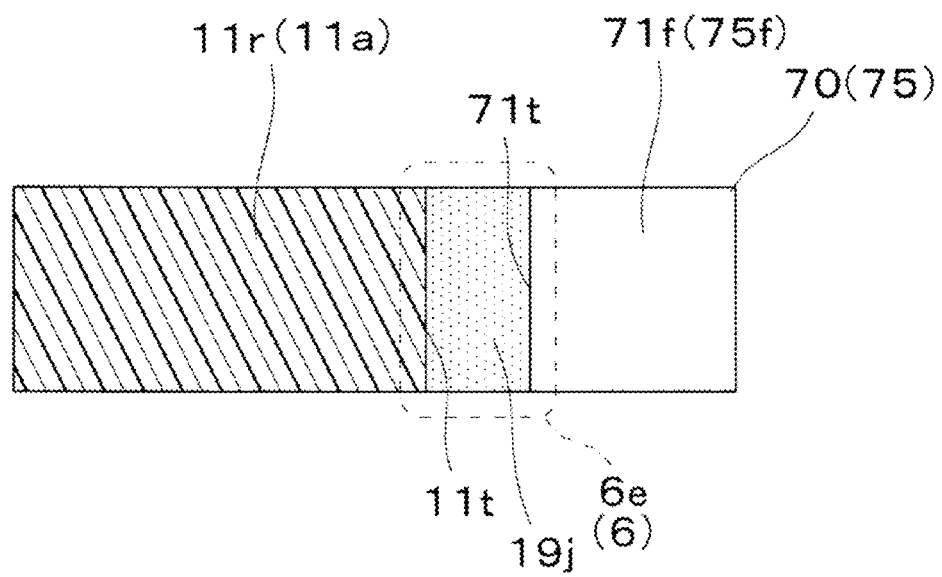
FIG. 15 is a conceptual cross-sectional view for explaining a filling-type intermediate seal structure.

FIG. 15 is a partially enlarged cross-sectional view illustrating the seal between the light-guiding member 10a and the exterior case 105d. In the first virtual image forming optical unit 101a, a band-shaped sealing member 19j is attached to a peripheral part 11r of the light-guiding member 10a or the tip end 11a. The sealing member 19j is made of, for example, a silicone rubber having water repellency. In a state in which the first virtual image forming optical unit 101a is fixed to the exterior case 105d, the sealing member 19j adheres to an opening frame portion 71f provided in the first member 71 and an opening frame portion 75f of the circuit board holder 75, and separates the inside and outside of the opening frames 71f and 75f in a liquid-tight state. An outer surface 11t of the tip end 11a and an inner surface 71t of the opening frame portions 71f and 75f are arranged in the vicinity, but are not necessarily arranged in parallel, and are arranged with the sealing member 19j interposed therebetween. A structure in which the peripheral part 11r, the opening frame portions 71f and 75f, and the sealing member 19j described above are combined is referred to as a filling-type intermediate seal structure 6e. In the intermediate seal structure 6e, the sealing member 19j seals the light-guiding member 10a with the opening frame portions 71f and 75f that are attachment ports to the exterior case. In this case, moisture can be prevented from entering the exterior case 105d from the boundary with the light-guiding member 10a exposed to the outside. When the sealing member 19j has water repellency, moisture can be prevented from passing through the gap between the light-guiding member 10a and the exterior case 105d. In this case, the pressure applied to the sealing member 19j can be reduced, thus moisture can be prevented from entering while reducing the stress applied to the light-guiding member 10a.

Note that, although detailed description is omitted, a sealing member 19z is provided between the opening frame portion 75f of the circuit board holder 75 and an opening adjacent part 72f of the second member 72 to enclose the signal line 48 extending from the electronic circuit board 42 (see FIG. 8). The sealing member 19z serves as a member sealing the passage of the signal line 48. Further, in the opening 71k formed in the rear wall portion 71d of the first member 71, the gap between the cable 109 and the opening 71k is sealed by a water-repellent rubber bush 6g (see FIG. 6).

Figure 16:
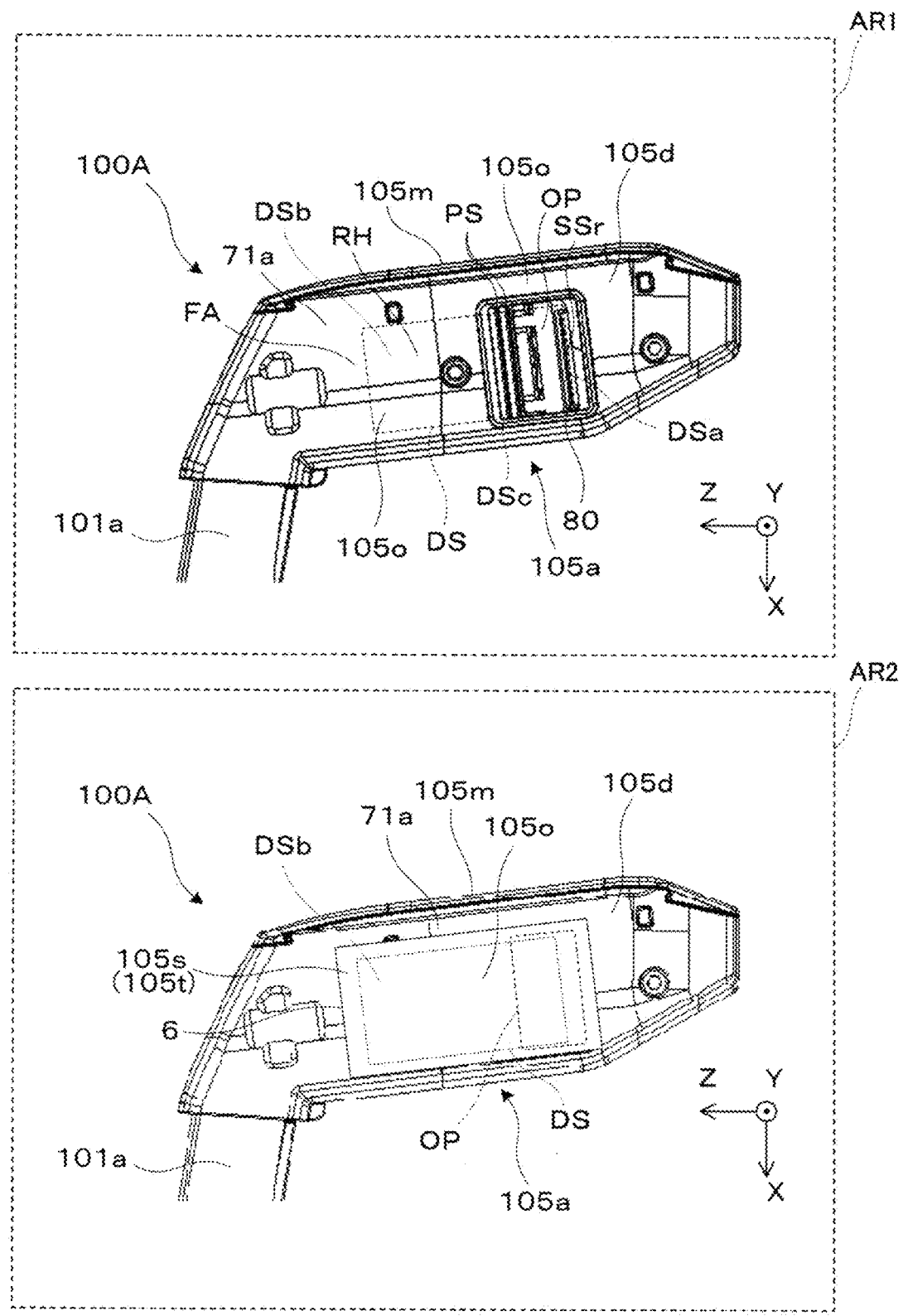
FIG. 16 is a diagram for explaining arrangement and sealing of a heat dissipation sheet.

With reference to FIG. 16, the arrangement and sealing of the heat dissipation sheet DS will be described in detail. In FIG. 16, a first area AR1 illustrates a state in which a base material of the bottom plate portion 71a of the exterior case 105d is exposed, and a second area AR2 illustrates a state in which the bottom plate portion 71a of the exterior case 105d is covered by the waterproof tape 105s.

The opening OP provided in the bottom plate portion 71a of the exterior case 105d is slightly larger than the cross-sectional size of the heat dissipation sheet DS. Thereby, the heat dissipation sheet DS can be easily passed through the opening OP, and the workability of assembling the heat dissipation sheet DS is improved. The heat dissipation sheet DS is fixed to the display element 80 at a first end DSa, and is fixed to the lower side surface (side surface) 105o of the exterior case 105d at the second end DSb. That is, the first end DSa of the heat dissipation sheet DS is attached to a back surface SSr of the display element 80, and the second end DSb of the heat dissipation sheet DS is attached to the lower side surface 105o of the exterior case 105d In this case, the heat dissipation sheet DS is fixed to pass from the display element 80 to the lower side surface 105o of the exterior case 105d, and heat of the display element 80 can be transferred to the lower side surface 105o of the exterior case 105d along the main surface of the heat dissipation sheet DS. Note that, as the second end DSb of the heat dissipation sheet DS is separated from the first end DSa, as the heat source and the heat dissipation point RH of the lower side surface 105o are separated, and the thermal gradient can be increased, thus the cooling effect of the heat dissipation sheet DS is enhanced. A plurality of protrusions PS or grooves are formed as periodic recesses in a portion of the bottom plate portion 71a where a center portion DSc of the heat dissipation sheet DS abuts around the opening OP. According to the protrusions PS, the contact area between the lower side surface (side surface) 105o of the exterior case 105d and the heat dissipation sheet DS can be reduced, and heat dissipation can occur in a location of the heat dissipation sheet DS close to the display element 80, thus the cooling effect can be prevented from deteriorating. That is, the center portion DSc of the heat dissipation sheet DS can be prevented from contacting the bottom plate portion 71a, the temperature gradient at the center portion DSc is prevented from decreasing, the heat flow from the first end DSa to the second end DSb of the heat dissipation sheet DS is promoted, and efficient heat dissipation can be achieved at the second end DSb in a region separated from the first end DSa. When the heat is conducted along the surface direction of the heat dissipation sheet DS, the thinner the heat dissipation sheet DS, the faster the heat transfers, but the thicker the heat dissipation sheet DS, the lager the heat capacity and the greater the amount of heat transfer. The thickness of the heat dissipation sheet DS is set in consideration of the amount of heat generated by the display element 80. Note that, the heat dissipation sheet DS is not limited to having a uniform thickness and width, and the thickness and width of the heat dissipation sheet DS may vary between the ends DSa and DSb, and the center portion DSc.

The opening OP and the heat dissipation sheet DS are covered and sealed by the waterproof tape 105s. The waterproof tape 105s is an impermeable sheet, one surface of which is an adhesive surface, and is adhered and airtightly fixed by adhering to the lower side surface 105o of the exterior case 105d. The waterproof tape 105s may be a waterproof steam-permeable tape 105t that is configured to prevent passage of water droplets and appropriately allow passage of steam. By using the waterproof tape 105s or the waterproof steam-permeable tape 105t, moisture or water droplets from the aperture OP can be prevented from entering the opening OP while enabling the heat dissipation from the opening OP and the like.

When the heat dissipation sheet DS is a conductive material such as a graphite sheet, the heat dissipation sheet DS can have an electromagnetic shielding function. In the embodiment, the heat dissipation sheet DS spreads to block the opening OP, and is arranged to contribute to the electromagnetic shield. In this case, electromagnetic shielding function of the exterior case 105d and the like can be enhanced to protect the circuits and the like inside and outside the exterior case 105d.

In the configuration described above, the structure and sealing method of the exterior case 105d are described with reference to the first image forming main body 105a, the first virtual image forming optical unit 101a, and the like. The structure of the exterior case 105d in the second image forming main body 105b and the like is the same as the structure of the exterior case 105d in the first image forming main body 105a and the like, and the sealing method is also the same, thus, description thereof is omitted. Note that, in the exterior case 105d, the inner seal structure 6a, the slide seal structures 6b and 6c, the intermediate seal structure 6e, the sealing member 19z, the rubber bush 6g, and the waterproof tape 105s are referred to as a waterproof structure 6, and the interior of the exterior case 105d is sealed by the waterproof structure 6. The waterproof structure 6 is not limited to the waterproof structure described above, and for example, part of the waterproof structure 6 can be replaced with waterproof grease, or waterproof grease can be used in combination. The waterproof structure 6 can increase the sealing properties in the exterior case 105d in each of the virtual image forming optical units 101a and 101b, but on the other hand, it can be said that the temperature in the exterior case 105d is likely to increase. Therefore, in addition to using a magnesium alloy as the material of the exterior case 105d, the opening OP is provided in the bottom plate portion 71a of the exterior case 105d to draw the heat dissipation sheet DS, the electronic circuit board 41 having a relatively high calorific value is arranged in the vicinity of the outer plate portion 72b, and the electronic circuit board 42 having a relatively low calorific value is arranged in the vicinity of the upper plate portion 72a, accordingly, both suppression of heat generation and waterproofing are achieved.

In the wearable display apparatus 100 according to the embodiment described above, the inner seal structure 6a is provided in a location where the circuit board holder 75 is opposed to the opposing connecting portion 77 of the exterior case 105d from the inner side. Thus, even if the fixing of the exterior case 105d is loosed and a slight gap is generated in the opposing connecting portion 77 of the exterior case 105d, when the inner seal structure 6a is functioning, the moisture can be prevented from entering the exterior case 105d.

Modified Examples and Other Matters

In the above description, the display element 80 is an organic EL display panel or an LCD panel, but the display element 80 may be a self-luminous display element represented by an LED array, a laser array, a quantum dot light emitting element, or the like. Further, the display element 80 may be a display using a laser scanner in which a laser light source and a scanner are combined. Note that, a liquid crystal on silicon (LCOS) technique may be used instead of the LCD.

The first member 71 and the second member 72 configuring the exterior case 105d are not limited to magnesium alloys, and may be made of aluminum or aluminum alloy.

Figure 17:
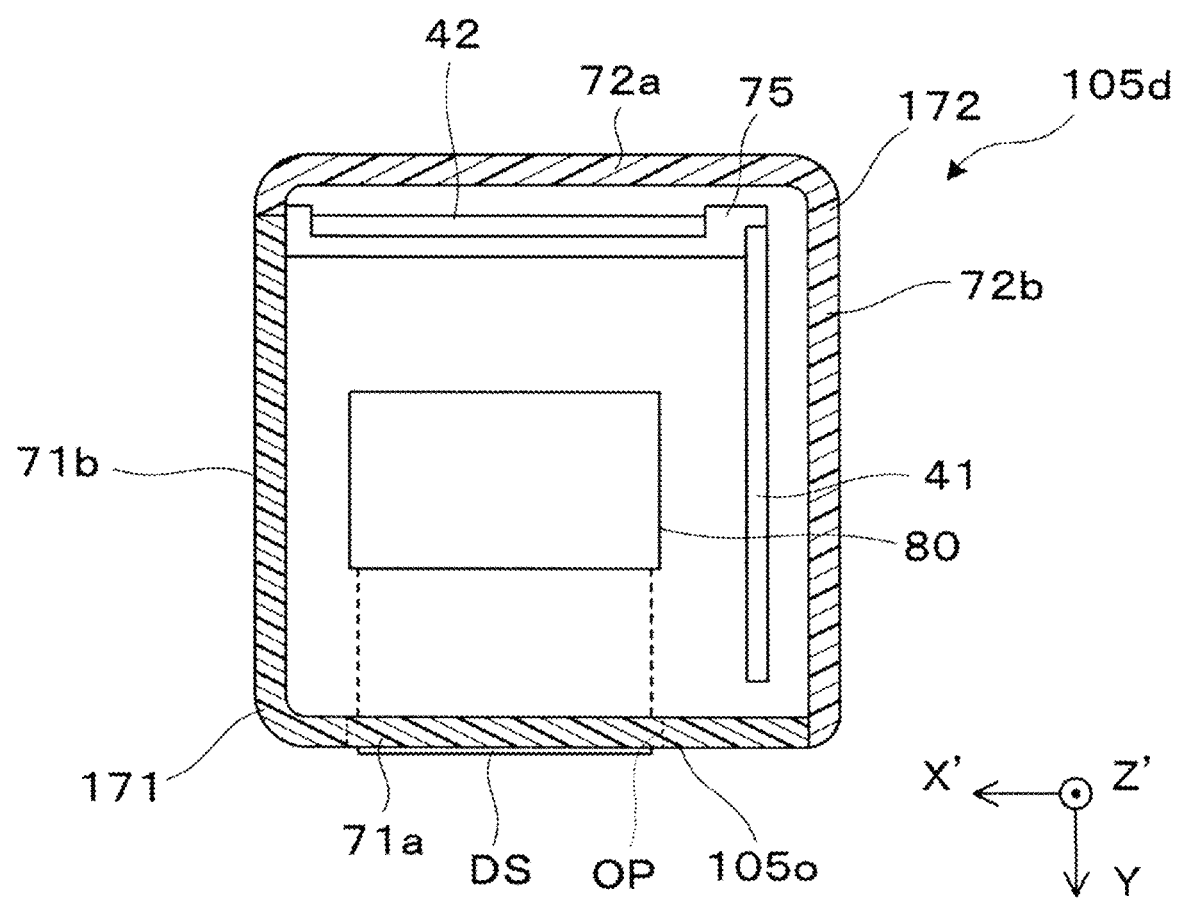
FIG. 17 is a conceptual cross-sectional view for explaining a modified example of the exterior case.

As illustrated in FIG. 17, the first member 171 and the second member 172 configuring the exterior case 105d are not limited to metals such as magnesium alloys, and may be made of a plastic material.

Figure 18:
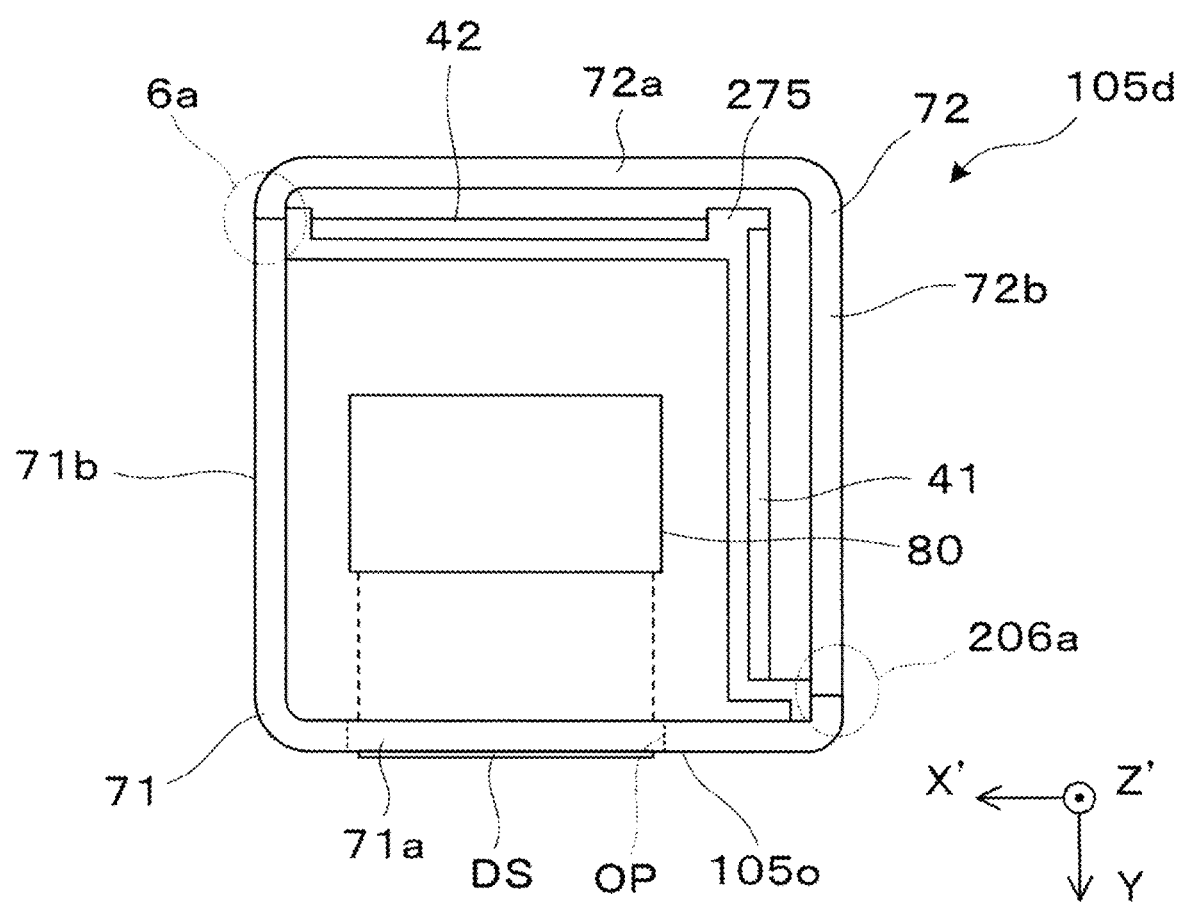
FIG. 18 is a conceptual cross-sectional view for explaining a modified example of a waterproof structure.

As illustrated in FIG. 18, in the exterior case 105d, in addition to providing the inner seal structure 6a between the upper plate portion 72a and the inner plate portion 71b and the like, for example, a circuit board holder 275 having a suitably modified shape may be used, in addition to providing the inner seal structure 6a between the upper plate portion 72a and the inner plate portion 71b and the like, a similar inner seal structure 206a may be provided between the bottom plate portion 71a and the outer plate portion 72b. Further, the inner seal structure 6a and the like are not limited to the exemplary locations, and may be arranged at appropriate locations depending on the application and structure of the wearable display apparatus.

The seal material used for the seal structures 6a, 6b, 6c, 6e, the sealing member 19z, and the like is not limited to the foam rubber and silicone rubber described above, and various materials may be used.

The electronic circuit board 41 that is the second circuit board may be divided into two parts. In this case, it is only necessary to consider the amount of heat generated in these parts as a whole, and efficient heat dissipation is achieved by arranging these parts adjacent to the outer plate portion 72b.

The electronic circuit board 41 is not limited to the functions described in the embodiment, and may have various functions. Specifically, the electronic circuit board 41 may have a power-related function such as a charging circuit regulator.

In the first image forming main body 105a, the electronic circuit board 41 is not essential, and the external device 200 may have the function of the electronic circuit board 41. In the second image forming main body 105b, a camera, a camera drive circuit, and the like may be added in addition to the display element 80, the electronic circuit board 42, and the like. Although not illustrated in the drawings, various sensors such as a temperature sensor, an external light sensor, and an acceleration sensor may be incorporated in the image forming main body 105a and 105b.

The electronic circuit boards 41 and 42 include semiconductor elements such as arithmetic elements and conversion elements. Specifically, the electronic circuit boards 41 and 42 may include at least one circuit such as a Digital Signal Processor (DSP), an Application Specific Integrated Circuit (ASIC), a Programmable Logic Device (PLD), and an Field Programmable Gate Processing Unit (FPGA), a Graphics Processing Unit (GPU), a Central Processing Unit (CPU).

Note that, a regulator of a charging circuit, a camera drive circuit, and the like, which are additional circuits, may also include at least one circuit such as a DSP, an ASIC, a PLD, a FPGA, a GPU, a CPU, or the like.

When the heat dissipation sheet DS is a graphite sheet, the heat dissipation sheet DS is not limited to a single layer and may include a plurality of graphite sheets. That is, the heat dissipation sheet DS may be formed by stacking a plurality of graphite sheets. The heat dissipation sheet DS is not limited to a graphite sheet, and may be made of a heat conductive synthetic resin material such as a heat conductive acrylic sheet, a silicon heat conducting sheet, or the like, and may be made of a metal-based material or a composite thereof.

A wearable display apparatus according to a specific aspect includes a display element, a circuit board, a circuit board holder configured to hold the circuit board, and an exterior case configured to accommodate the display element and the circuit board, wherein an inner seal structure is provided in a location where the circuit board holder faces a connecting portion of the exterior case from an inner side thereof.

In the wearable display apparatus described above, the inner seal structure is provided in an opposing point where the circuit board holder faces the connecting portion of the exterior case from the inner side thereof, thus, even if the fixing of the exterior case is loosened and a slight gap is generated in the connecting portion of the exterior case, when the inner seal structure is functioning, moisture can be prevented from entering the exterior case.

In a specific aspect, the inner seal structure causes a member to intimate contact with the connecting portion from the inner side, thereby implementing sealing from the inner side.

In another aspect, the inner seal structure is provided so as to accompany the connecting portion formed on the inner side, which is the wearer side of the exterior case. In this case, waterproof properties on the inside increase, and durability against moisture such as sweat can be enhanced.

In yet another aspect, the inner seal structure includes a sealing member made of an elastic resin. In this case, the sealing member can be adhered to the connecting portion of the exterior case from the inner side, and it becomes easy to maintain fluid tightness.

In yet another aspect, the sealing member is made of a foam rubber. In this case, the deformation and adhesion of the sealing member can be easily secured.

In yet another aspect, the exterior case is made of a magnesium alloy. By forming the exterior case with a magnesium alloy, high thermal conductivity while being lightweight can be achieved, and heat dissipation of the circuit board and the display element via the exterior case can be made effective.

In yet another aspect, the exterior case is made of a plastic material.

In yet another aspect, the circuit board holder is made of a plastic material. In this case, the degree of freedom of the shape of the circuit board holder increases, and the accommodation and arrangement inside the exterior case is facilitated.

In yet another aspect, the inner seal structure is configured to implement sealing in parallel to the screwing direction of the exterior case. In this case, the external case can be opened and closed with screws, and the function of the inner seal structure can be maintained even if the exterior case is somewhat loosened.

In yet another aspect, the exterior case includes a first member and a second member configured to form an inner space by being combined together while sliding with each other.

In yet another aspect, a slide seal structure is provided between the first member and the second member and at a location different from that of the inner seal structure. In this case, waterproofing can be achieved in the overlapping connecting portion that is closed by the slide guides.

In yet another aspect, the exterior case holds a lens barrel that supports an optical element for image formation. In this case, the lens barrel, the circuit board, and the like can be collectively accommodated in the exterior case, the wearable display apparatus can be made multifunctional and the appearance can be made small and stylish.

In yet another aspect, the lens barrel and the display element are fixed to the circuit board holder and the exterior case.

In yet another aspect, the wearable display apparatus further include a sealing member configured to seal, at an attachment port to the exterior case, a light-guiding member configured to guide image light from the display element. In this case, moisture can be prevented from entering the exterior case from the boundary with the light-guiding member exposed to the outside.

In yet another aspect, the sealing member has water repellency to prevent moisture from passing through the gap between the light-guiding member and the exterior case. In this case, moisture can be prevented from entering while reducing the stress applied to the light-guiding member.

In yet another aspect, the interior of the exterior case is sealed by a waterproof structure including the inner seal structure.

In yet another aspect, the exterior case includes an opening, the opening being sealed by a waterproof tape or a waterproof steam-permeable tape. In this case, heat dissipation and the like can occur from the opening, but moisture or water droplets can be prevented from entering the opening.

What is claimed is:

1. A wearable display apparatus, comprising:
   a display element;
   a circuit board;
   a circuit board holder configured to hold the circuit board; and
   an exterior case configured to accommodate the display element and the circuit board, the exterior case including a first member and a second member connected together at a joint therebetween, wherein
   an inner seal structure is provided in a location where the circuit board holder faces the joint of the exterior case from an inner side thereof, and
   the inner seal structure includes a part of the circuit board holder that faces the joint and a sealing member located between the part and the joint, the sealing member having two opposite surfaces, with one of the two surfaces in direct contact with the joint and the other of the two surfaces in direct contact with the part.

2. The wearable display apparatus according to claim 1, wherein the inner seal structure presses the sealing member into intimate contact with the connecting portion from the inner side, thereby implementing sealing from the inner side.

3. The wearable display apparatus according to claim 1, wherein the inner seal structure is provided along the connecting portion formed on the inner side, which is the wearer side of the exterior case.

4. The wearable display apparatus according to claim 1, wherein the sealing member is made of an elastic resin.

5. The wearable display apparatus according to claim 4, wherein the sealing member is made of a foam rubber.

6. The wearable display apparatus according to claim 1, wherein the exterior case is made of a magnesium alloy.

7. The wearable display apparatus according to claim 1, wherein the exterior case is made of a plastic material.

8. The wearable display apparatus according to claim 1, wherein the circuit board holder is made of a plastic material.

9. The wearable display apparatus according to claim 1, wherein the inner seal structure is configured to implement sealing in parallel to a screwing direction for the exterior case by a screw.

10. The wearable display apparatus according to claim 1, wherein the first member and the second member are configured to slide together and form an inner space.

11. The wearable display apparatus according to claim 10, wherein a slide seal structure is provided at a location that is between the first member and the second member and is different from that of the inner seal structure.

12. The wearable display apparatus according to claim 1, wherein the exterior case is configured to hold a lens barrel that supports an optical element for image formation.

13. The wearable display apparatus according to claim 12, wherein the lens barrel and the display element are fixed to the circuit board holder and the exterior case.

14. The wearable display apparatus according to claim 1, comprising a light-guiding member configured to guide image light from the display element, wherein
   the sealing member is configured to seal the light-guiding member at an attachment port of the exterior case.

15. The wearable display apparatus according to claim 14, wherein the sealing member has water repellency to prevent moisture from passing through a gap between the light-guiding member and the exterior case.

16. The wearable display apparatus according to claim 1, wherein an interior of the exterior case is sealed by a waterproof structure including the inner seal structure.

17. The wearable display apparatus according to claim 1, wherein the exterior case includes an opening, the opening being sealed by a waterproof tape or a waterproof moisture-permeable tape.

* * * * *